(12) United States Patent
Sakuma et al.

(10) Patent No.: US 6,766,038 B1
(45) Date of Patent: Jul. 20, 2004

(54) APPARATUS AND METHOD FOR IMAGE PROCESSING

(75) Inventors: Satoshi Sakuma, Yokohama (JP); Yasuko Takahashi, Yokohama (JP); Akio Shio, Yokohama (JP); Sakuichi Ohtsuka, Yokohama (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 09/577,887

(22) Filed: May 25, 2000

(30) Foreign Application Priority Data

May 28, 1999 (JP) .......................................... 11-149177

(51) Int. Cl.⁷ ................................................ G06K 9/00
(52) U.S. Cl. ...................... 382/107; 340/933; 340/936; 340/937; 702/142
(58) Field of Search ................................ 382/103–107; 348/149; 702/142; 340/933, 936, 937

(56) References Cited

U.S. PATENT DOCUMENTS

| | | | |
|---|---|---|---|
| 4,135,817 A | | 1/1979 | Young et al. |
| 4,817,166 A | * | 3/1989 | Gonzalez et al. ........... 382/105 |
| 4,878,248 A | * | 10/1989 | Shyu et al. .................. 382/105 |
| 5,642,299 A | * | 6/1997 | Hardin et al. ............... 702/142 |
| 5,757,287 A | * | 5/1998 | Kitamura et al. ........... 340/937 |
| 5,809,161 A | * | 9/1998 | Auty et al. .................. 382/104 |
| 6,040,586 A | * | 3/2000 | Slettnes ....................... 250/573 |

FOREIGN PATENT DOCUMENTS

| | | |
|---|---|---|
| JP | 59-156673 | 10/1984 |
| JP | 4-198870 A | 7/1992 |
| JP | 6-66820 A | 3/1994 |
| JP | 6-66820 | 3/1994 |
| JP | 06066820 | 3/1994 |
| JP | 11025258 | 1/1999 |
| JP | 2000-97968 | 4/2000 |
| JP | 2000-162220 | 6/2000 |
| WO | WO98/02390 | 1/1998 |
| WO | WO98/54671 | 12/1998 |
| WO | 98/54671 A1 | 12/1998 |

OTHER PUBLICATIONS

Aoki, "Traffic Flow Measurement Using Double Slit Images", Road Traffic and Automobiles, vol. RTA–94, No. 1–5, pp. 41–50 and 232–240 (1994).
Shokodo, "Image Processing Handbook", pp. 396–397 (1987).
Shio, "Character Recognition in Scene Images", Nippon Telegraph and Telephone Corporation, SME Technical Paper, 10–33 through 10–44 (1989).
Nemoto, et al., "Traffic Flow Measurement using Double Slit Measurement", Seikei University, pp. 393–400, 95ATS038.

* cited by examiner

Primary Examiner—Leo Boudreau
Assistant Examiner—Tom Y. Lu
(74) Attorney, Agent, or Firm—Thelen Reid & Priest, LLP

(57) ABSTRACT

The method for measuring speed is performed by dividing the time sequence image data A into long and narrow frames (step 401). Next, the framed images and the time sequence image data B produced by the line scan camera B are correlated to obtain a moving time (step 402). Next, a moving time of each framed image and a corresponding moving distance are obtained to compute a moving speed (step 403). Next, scale of a specific shape pattern and the like is corrected using the moving speed obtained to match the scales in the two image sequences A and B to obtain a similarity degree (step 404). Next, a threshold value is applied to the similarity degree to recognize the specific shape pattern, thereby recognizing that the images are produced by a moving vehicle.

2 Claims, 29 Drawing Sheets

601; SPECIFIC SHAPE PATTERN TEMPLATE

604; SPECIFIC SHAPE PATTERN TEMPLATE AFTER CORRECTION

FIG. 14
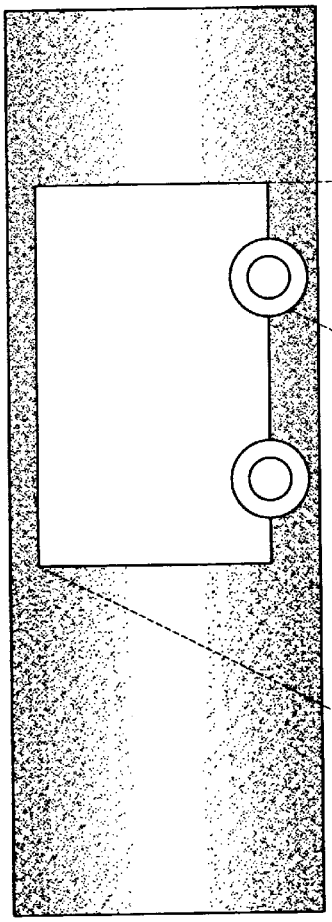
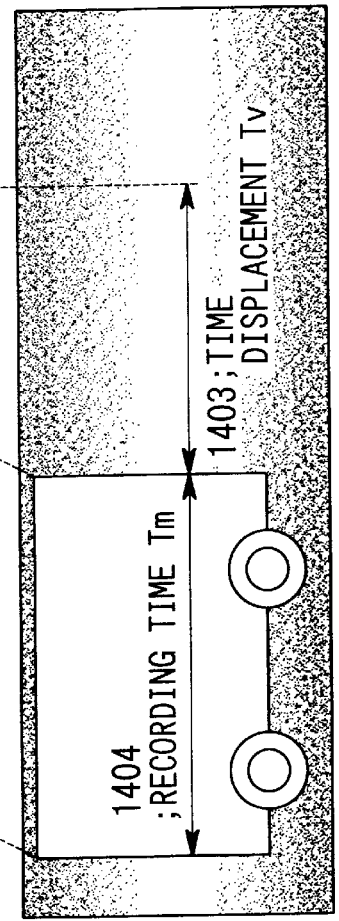

FIG. 16
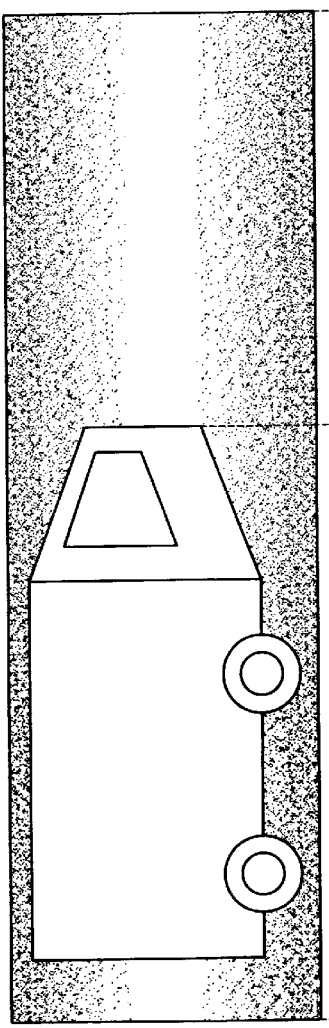
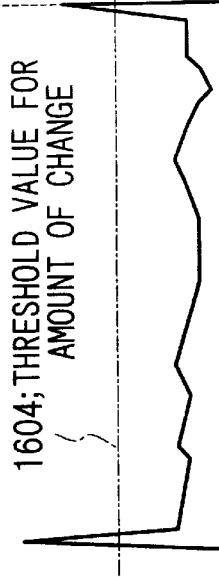
1601; TIME SEQUENCE IMAGE DATA A FROM LINE SCAN CAMERA A
1605; TIME AXIS
1604; THRESHOLD VALUE FOR AMOUNT OF CHANGE
1603; IMAGE CHANGE POINT
1602; CHRONOLOGICAL CHANGE IN AMOUNT OF CHANGE BETWEEN THE CURRENT LINE IMAGE AND THE PREVIOUS LINE IMAGE

FIG. 25
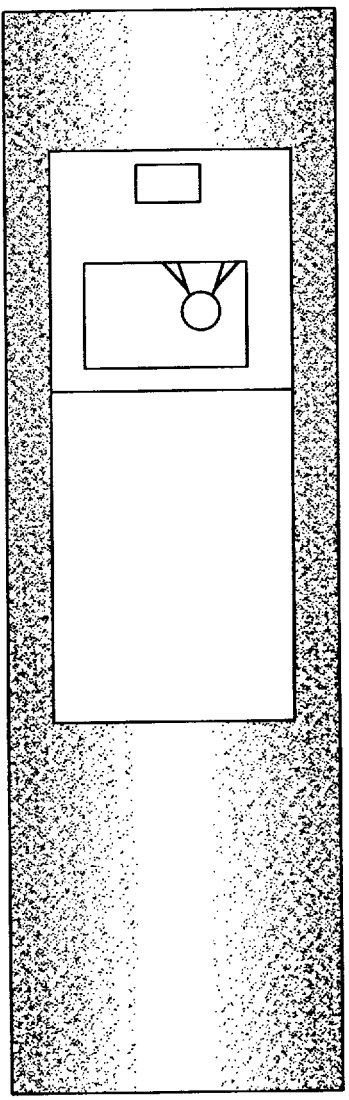
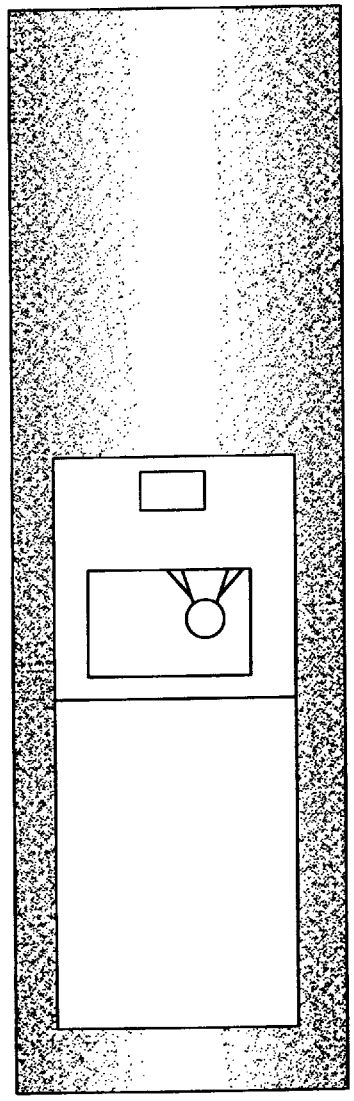

FIG. 27
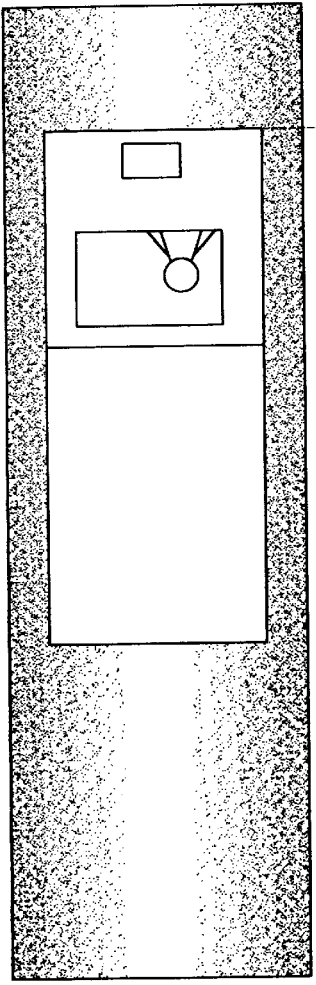
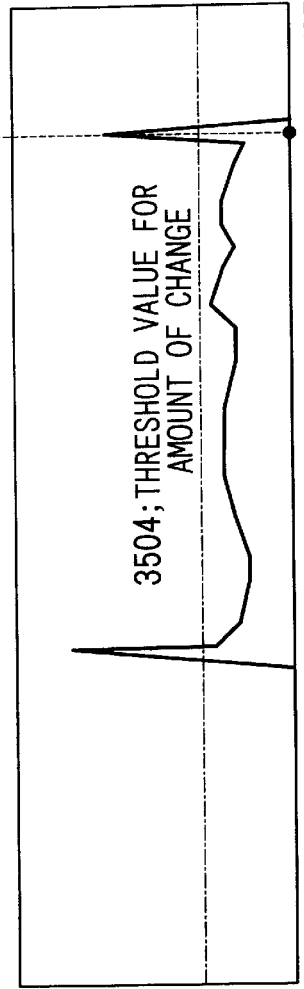

FIG. 28
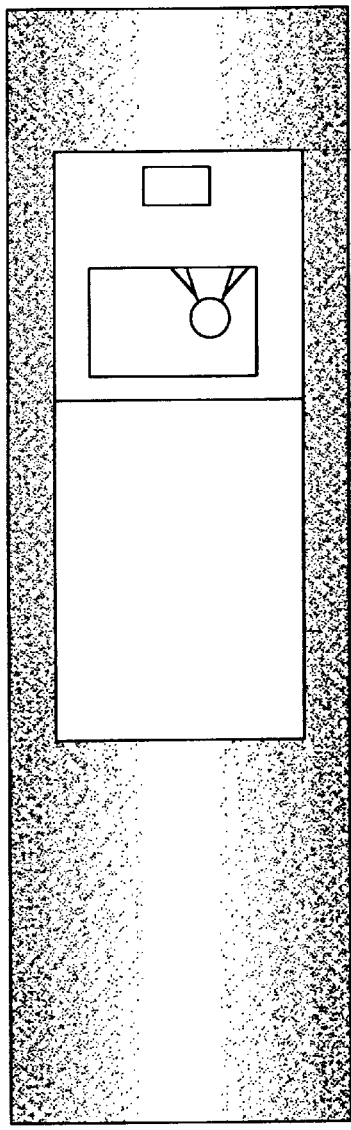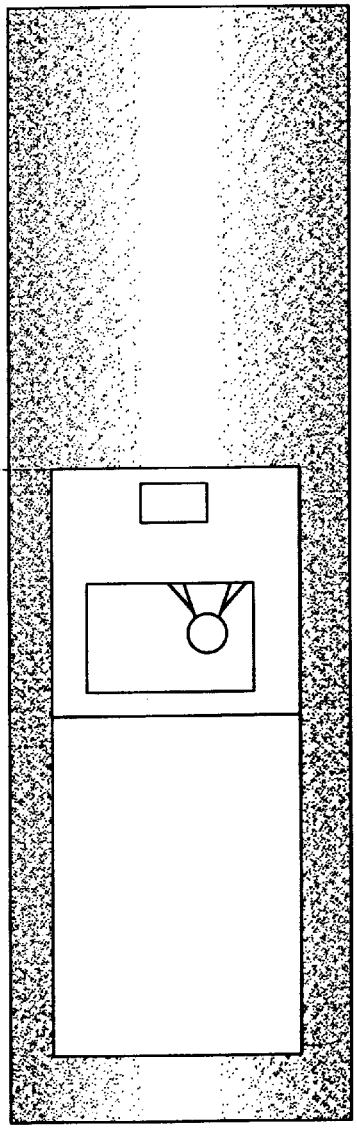

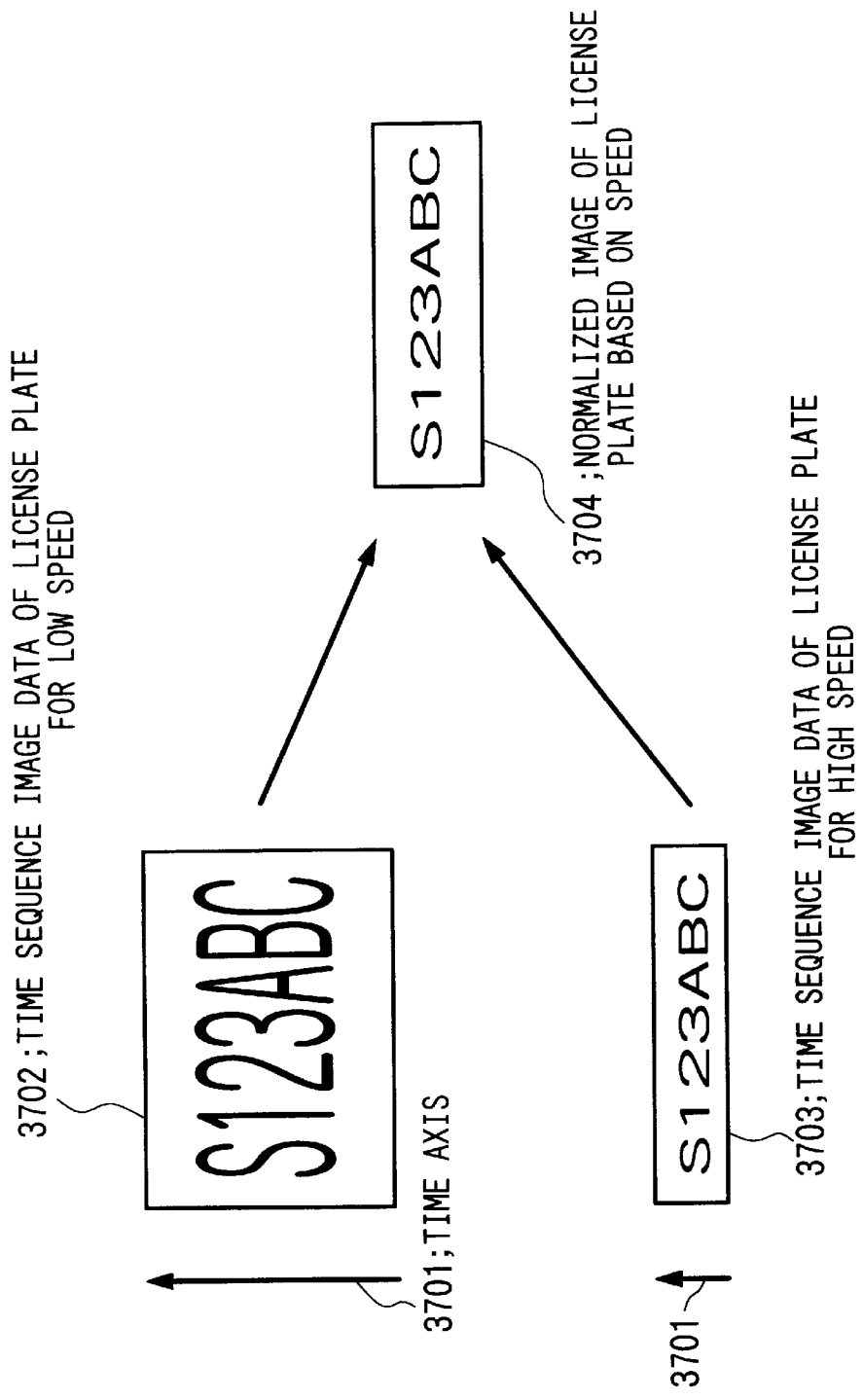

APPARATUS AND METHOD FOR IMAGE PROCESSING

BACKGROUND OF THE INVENTION

1. Field of the Invention

The present invention relates a method for measuring the length and a relative moving speed of an object moving with respect to a point of observation from time sequence image data produced by using line scan cameras and the like, and a pattern recognition method and apparatus based on the resulting image data.

2. Description of the Related Art

An example of the method of measuring a speed of a moving object using a plurality of sensors is based on the use of two phototubes. In this method, two phototubes are placed apart in parallel, and the speed of the moving object is obtained from the timings of the object crossing the two phototubes in successive instances, and is widely used for speed measurements of cars and other moving objects.

On the other hand, the following references are examples of the method for determining the speed and length of a moving object from images. "Traffic flow measurements using the double slit method" (reference 1, Road Traffic and Automobiles, The Institute of Electrical Engineers of Japan, Vol. RTA94-5, 1994) and "Traffic flow measurements using the double slit camera" (reference 2, The Institute of Electronics Engineers of Japan, Vol.26, No.3, 1997). These methods are based on providing imaginary slits within the images recorded using a general purpose video-camera and obtaining spatial time images by linking the images between the slits. Two slits are placed in the images, so that the moving speed and the length of the object are measured by obtaining the time interval for the object to pass through the two slits.

However, in the above related art, there are problems outlined in the following.

When either the observation point or the vehicle moves along a determined track, and considering the topics for measuring relative speeds, the length of the object and recognizing the pattern of the moving object using the conventional phototubes, it is necessary to position the phototubes so that they surround the object. Also, because it is not possible to obtain images by this technique, it is not possible to know what type of object had passed between the sensors. Therefore, it is necessary to visually confirm the nature of the object.

In the meantime, according to conventional video images, because the two slit planes are not parallel, the depth of field must be fixed first, so that the distance of movement between the actual slits can be determined separately. Also, the general purpose video camera can only record at 30 frames/second, so that if the object is moving at high speeds, it is not possible to produce precision measurement of speed. Also, there is no known method of measuring the relative speed of an object using the images taken by placing a camera on another moving object.

SUMMARY OF THE INVENTION

It is an object of the present invention to solve the problems inherent in the conventional technology and provide a method for measuring speed and length of an object and a method of recognizing a shape pattern and to provide an apparatus for use therefor. The topic of the present invention to provide a technique of processing data simply when an observation point and an object are moving relative to the other to obtain a relative moving speed; when an observation point is stationary and an object is moving to obtain a relative moving speed and a length of the object; and a shape pattern recognition method in such cases.

According to the present invention, the object has been achieved in a method for processing image data to measure a relative speed of a target object moving along a given track relative to an observation point, comprising the steps of: obtaining time sequence image data recorded by synchronously operating a plurality of line image acquiring apparatuses, arranged transversely to the given track of the moving object, so as to record time sequence images appearing between two parallel line axes at a constant timing determined by a line scanning cycle; correlating framed images of the object in the time sequence image data by computing a similarity degree, and obtaining a moving time interval of the object, to move between the line image acquiring apparatuses, from correlated images according to the value of time displacement of the object and the line scanning cycle; and obtaining a relative speed of the object relative to the observation point according to the moving time interval and a distance separating the line image acquiring positions of the line image acquiring apparatuses.

Using the method presented above, line image acquiring apparatus is able to obtain clear images in a short interval time, and using the images thus obtained, a relative moving speed of the object can be measured.

Also, the object of the present invention has been achieved in a method for recognizing an object having a specific shape pattern that can be recognized as an image moving along a given track relative to an observation point, comprising the steps of: obtaining a relative moving speed of the object moving relative to the observation point according to the method recited above; matching a time scale of the time sequence image data and a time scale of a template for the specific shape pattern prepared beforehand by correcting respective time scales according to the relative moving speed; and computing a similarity degree between the time sequence image data and the template of the special shape pattern having a matched time scale, thereby detecting and recognizing the specific shape pattern in the time sequence image data.

Using the method described above, it becomes possible to readily recognize a pattern belonging to a moving object.

Also, the object of the present invention has been achieved in a method for measuring a length of an object from time sequence image data obtained at a stationary observation point by recording the object moving along a given track, comprising the steps of: obtaining a relative moving speed of the object moving relative to the observation point according to the method recited above; detecting a starting point and an ending point of the object in each time sequence image data by evaluating whether or not a difference value between a framed image and a time sequence background image data prepared beforehand, exceeds a threshold value; and obtaining a recording time interval between the starting point and the ending point according to the line scanning cycle, and computing the length of the object from the recording time interval and the moving speed of the object.

Using the method described above, it is possible to measure a length of an object.

Also, in the present invention, it is possible to measure a relative moving speed and a shape pattern of a moving object, when an observation point and the moving object are moving on a given track relative to the other. Also, it is possible to measure a length of a moving object, when the observation point is stationary.

Also, in the present invention, there is no need for placing line image recording apparatus (line scanning camera and the like) to surround the object, and therefore, the arrangement of the apparatuses is facilitated compared with conventional phototubes and the like. In contract to using the phototubes, image data of the object can be accumulated so that the object can be identified after the measurements.

Also, by using line image recording apparatus, it is possible to provide highspeed recording of a moving object at about 1000 times the speed of conventional video cameras, so that moving speed of a fast moving object can be determined. Unlike the case of using video cameras, many line image recording apparatuses can be positioned in parallel to enable speed measurements without being affected by problems related to the distance from the cameras.

Also, in the present invention, by increasing the number of line image recording apparatus to be used, the number of speed and length measurements that can be performed by the system increases according to the number of combination of the line image recording apparatuses to increase the accuracy of determination. Also, even if an object cannot be recognized from one image data due to adverse effects from noise and other factors, other image data can be processed for recognition so that pattern recognition accuracy can be improved.

Also, the present apparatus can be operated to record visible radiation passively so that an object can be recorded and its shape pattern recognized without being detected.

BRIEF DESCRIPTION OF THE DRAWINGS

FIG. 14 show side views of examples of the output images from a line scan camera in Embodiment 2.

FIG. 16 is an example of the output image from the line scan camera in Embodiment 3 and a graph showing the amount of change in the image.

FIG. 25 is an illustrated view of an example of the output from the line scan camera in Embodiment 5.

FIG. 27 is an example of the output image from the line scan camera in Embodiment 5 and a graph showing the amount of change in the image.

FIG. 28 is an illustrated view of the results of image pattern extraction in Embodiment 5.

FIG. 29 is a diagram to show speed correction for a license plate image in Embodiment 5.

DESCRIPTION OF THE PREFERRED EMBODIMENTS

The following embodiments do not restrict the interpretation of the claims relating to the present invention, and the combination of all the features explained in the embodiments is always not being indispensable means of solving the problem.

In the following, preferred embodiments will be explained in detail.

Embodiment 1

Speed measurements and pattern recognition method and embodied examples of the apparatus in Embodiment 1 will be explained. In this embodiment, two units of line scan cameras, as an example of a plurality of line scan cameras, are used in the system and are mounted on a moving vehicle to perform image processing so that the speed of the moving vehicle can be measured and the image of a stationary object represented by a stationary vehicle can be recognized. In other words, the relative speed of the object moving relatively to the system along a given track can be measured.

Figure 1:
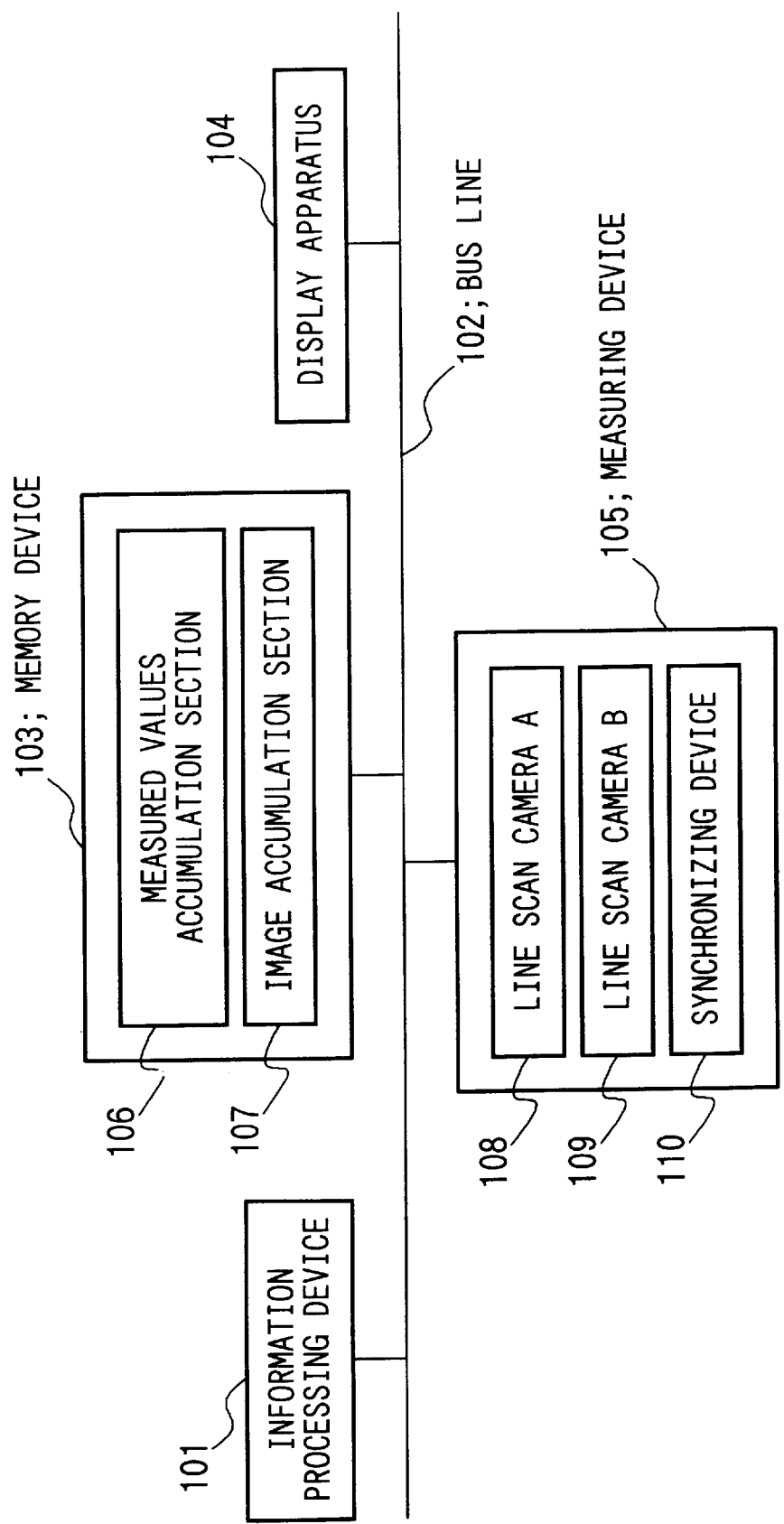
FIG. 1 is a block diagram of an example of the measuring apparatus in Embodiment 1.

FIG. 1 shows an apparatus for performing the speed measurement and pattern recognition method in Embodiment 1. In to the information processing apparatus 101 shown in FIG. 1, a memory device 103, a display device 104 such as image monitor and a measuring device 105 are connected thereto through a bus line 102. The memory device 103 is provided, in its interior, with a measurement results accumulation section 106 and an image accumulation section 107. Also, inside the measuring device 105 are provided a line scan camera A108, a line scan camera B109 and a synchronizing device 110. In this case, the synchronizing device 110 is represented by a pulse generator. The time image data from the line scan cameras are recorded by synchronizing the two cameras at a constant timing determined by a line scanning cycle.

The line scan cameras used in this embodiment are a monochromatic cameras having 8-bit pixels of 256 gradations each, and the number of pixels comprising each line is 2024 pixels and each line is scanned at a cycling time of 100 µs.

Figure 2:
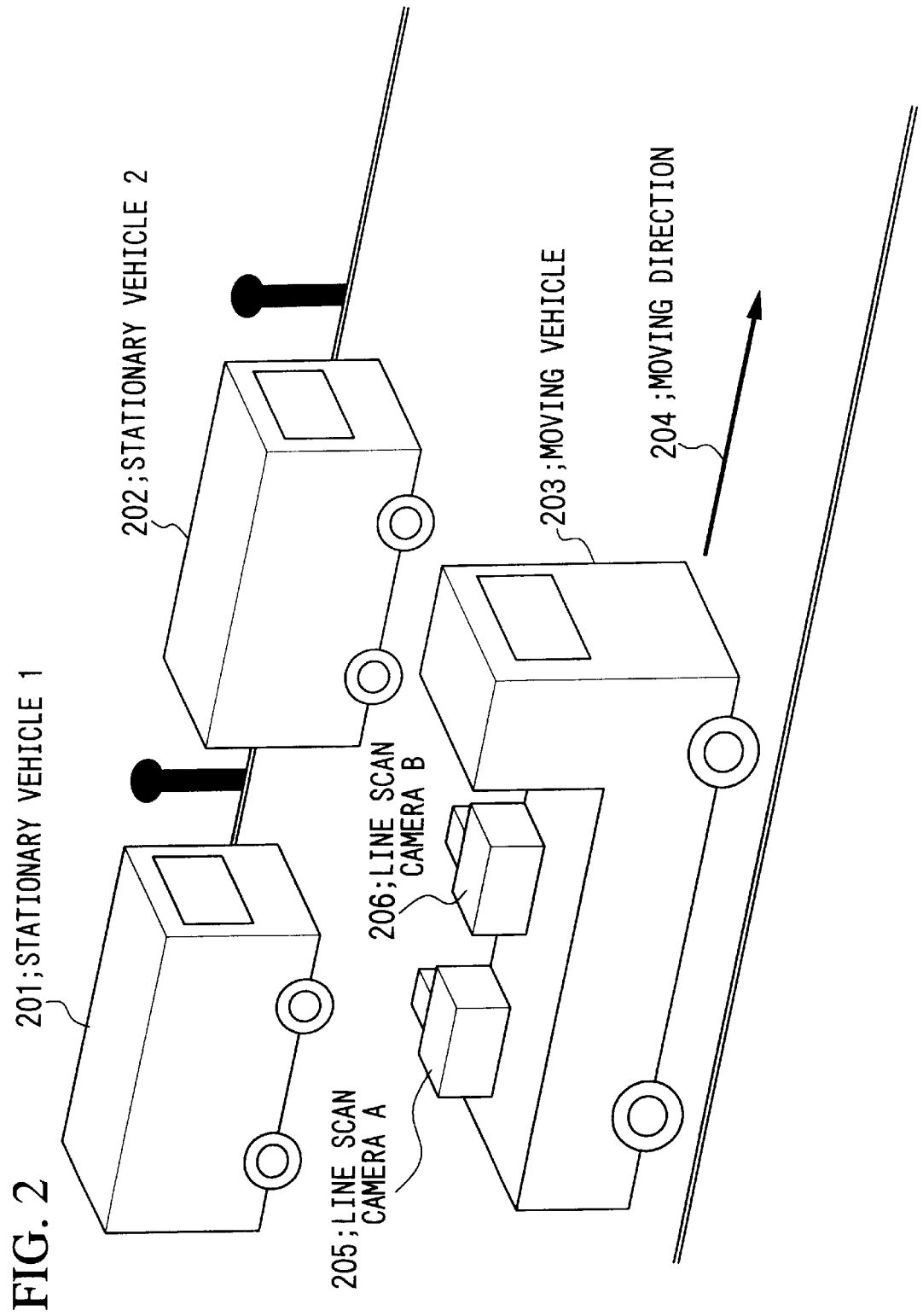
FIG. 2 is a diagram of an example of the measuring system for recognizing a stationary vehicle in Embodiment 1.

FIG. 2 shows a measurement method, a pattern recognition method and an example of a measurement system using the measuring apparatus, and 201 represents a stationary vehicle 1; 202a stationary vehicle 2; 203a moving vehicle; 204 the moving direction; 205 a line scan camera A installed on the moving vehicle 203; and 206 a line scan camera B installed on the moving vehicle 203.

Figure 3:
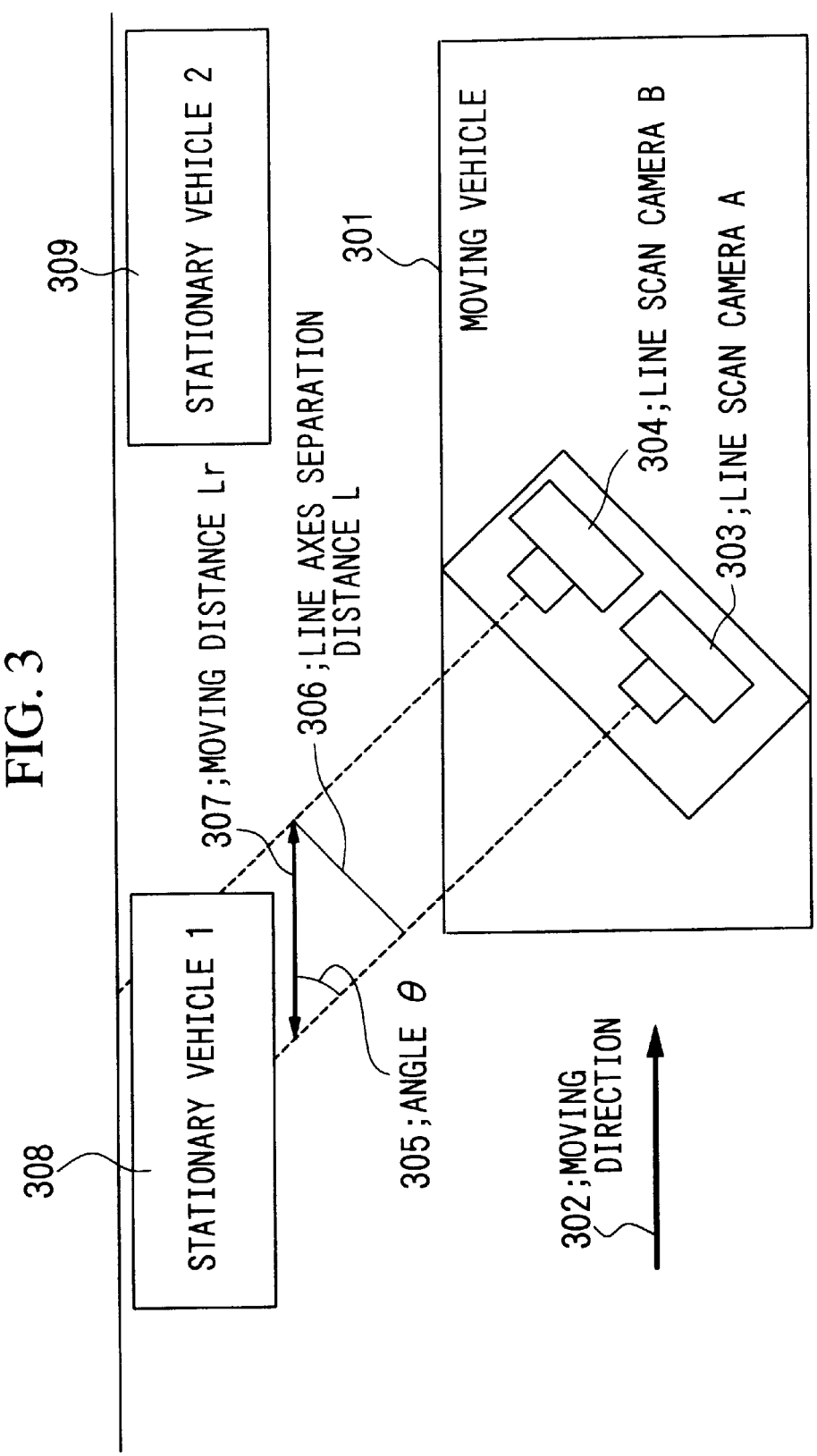
FIG. 3 is a top view of the measuring system shown in FIG. 2.

FIG. 3 is a top view of the measuring system shown in FIG. 2, and 301 represents the moving vehicle; 302 the moving direction; 303a line scan camera A; 304a line scan camera B; 305 an angle θ; 306 a distance L between the line axes (line axes spacing distance L); 307a moving distance Lr of the moving vehicle; 308 a stationary vehicle 1; and 309 a stationary vehicle 2. The direction of the moving vehicle 301 is designated by 302, and it is assumed that the line scan camera A303 and the line scan camera B304 are inclined at an angle θ 305 with respect to the moving direction 302. Then, the actual moving distance Lr 307 of the stationary vehicle between the line axes is obtained by an expression:

$Lr=L/\sin(\theta)$.

Figure 4:
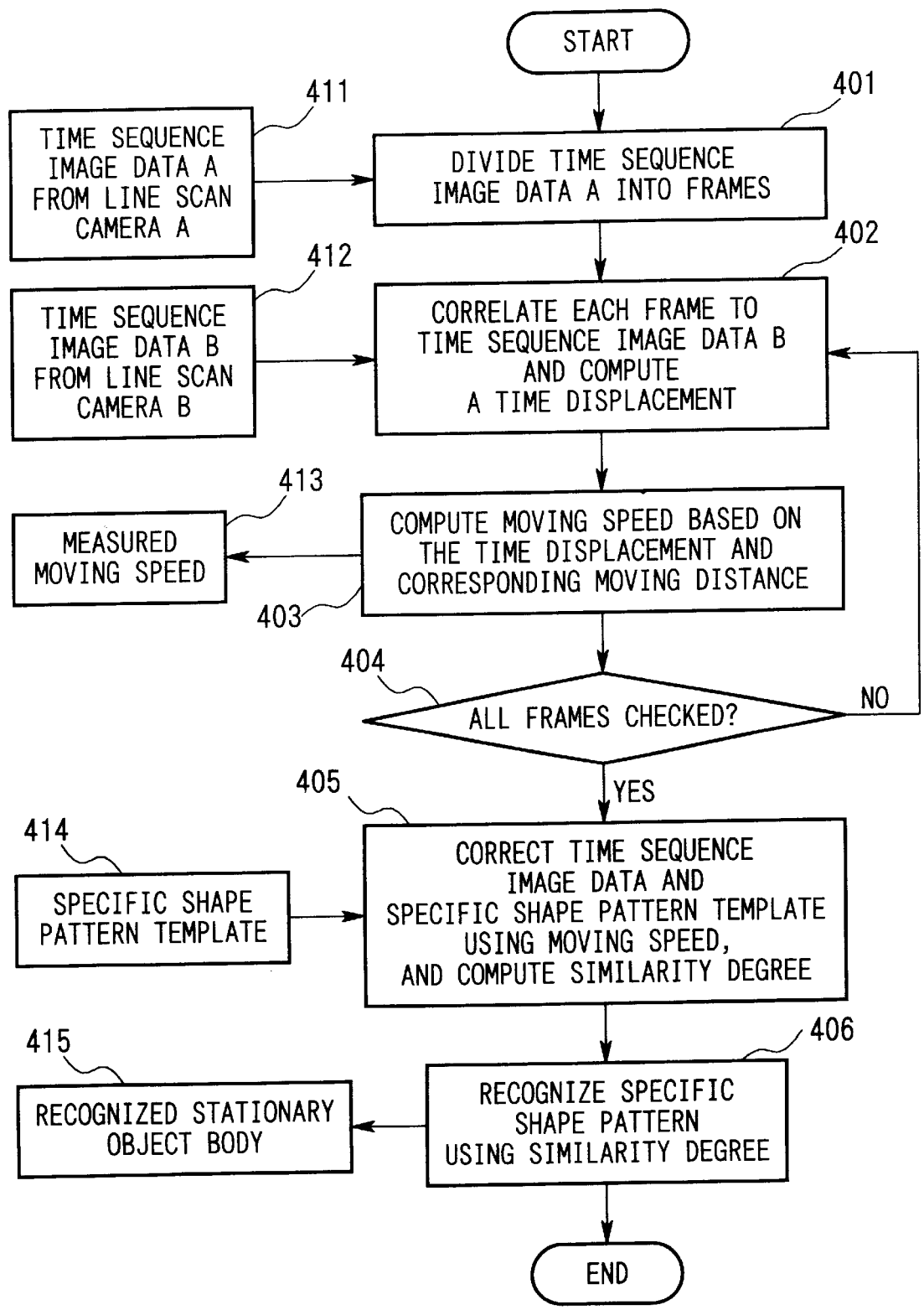
FIG. 4 is a flowchart of a process of speed measurement and pattern recognition in Embodiment 1.

FIG. 4 is a flowchart for a method of speed and length measurements and pattern recognition in this embodiment, and processing between step 401 to step 406 is executed by the information processing device 101 such as CPU of a personal computer and the like. The method of speed and length measurements and pattern recognition will be explained in the following with reference to the flowchart in FIG. 4.

Initially, a relative speed of the moving vehicle is measured.

Figure 5:
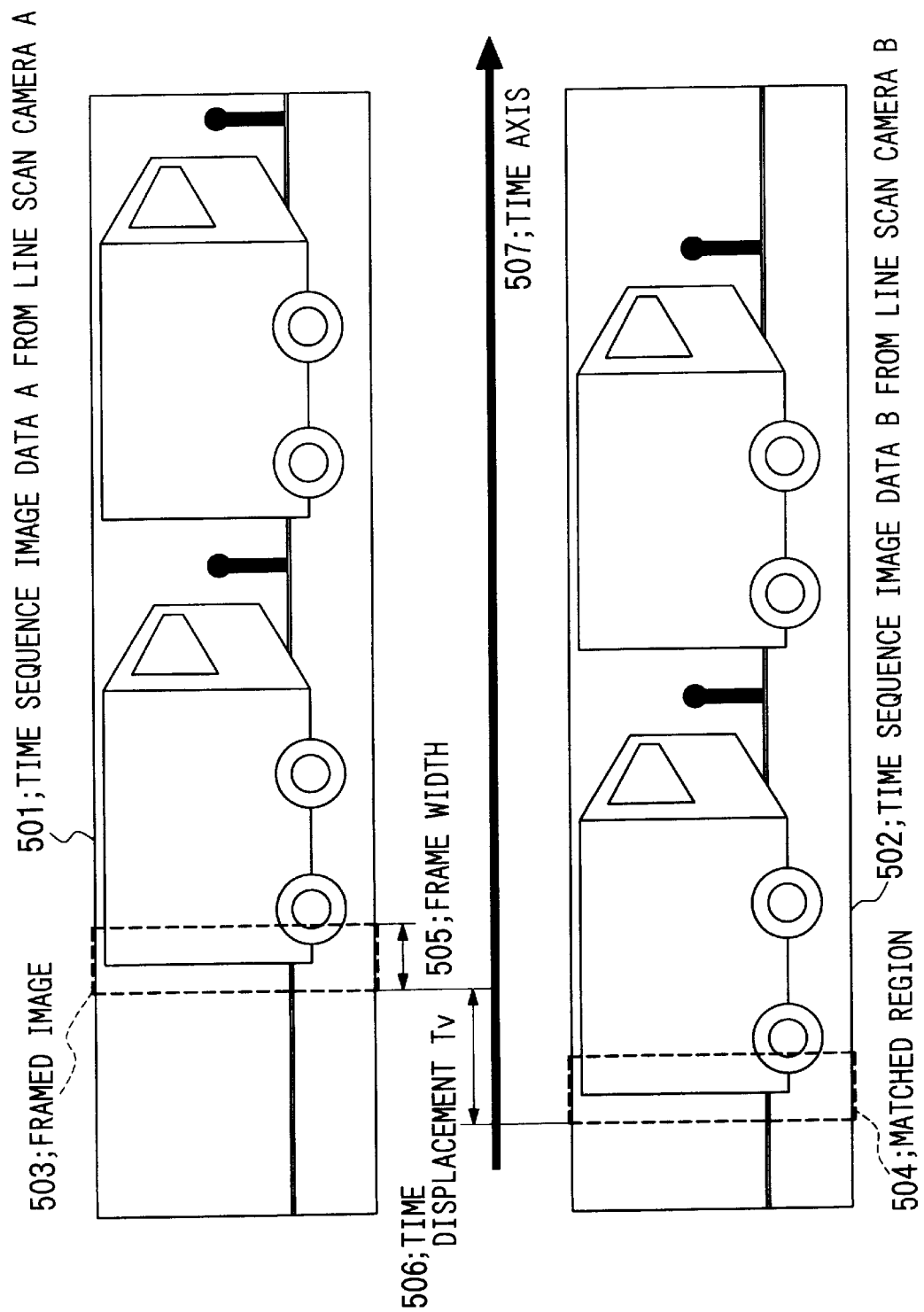
FIG. 5 is an illustration of an example of the output image from a line scan camera in Embodiment 1.

First, time sequence image data A411 recorded by the line scan camera A303 are divided into long frames having a narrow width (step 401). FIG. 5 shows an example of the time sequence image data and the framed images, and 501 refers to the time sequence image data A recorded by the line scan camera A, 502 refers to time sequence image data B recorded by the line scan camera B, 503 to a narrow rectangular framed image in the data A501, 504 to a matched region found in the data B302, 505 to a frame width W and 506 to a moving time interval Tv. Here, it is preferable that the number of lines along the time axis of a framed image be about 10~20 lines, and since the number of pixels per line is 2,048, the number of pixels in one framed image is about 20,480~40,960.

Next, the framed image 503 is correlated with the time sequence image data B412 recorded by the line scan camera B304, and a size of a respective time displacement 506 of the object is computed (step 402). It can be seen in FIG. 5 that the stationary vehicle crosses the viewing front of the line scan camera B304 before that of the line scan camera A303, so that the image region 504 in the time sequence image data B that matched the framed image 503 is found near the beginning portion of the time axis 507. Therefore, the degree of similarity is obtained by restricting the search to only the negative direction on the time axis 507 to compute the difference value and the correlation coefficient (refer to reference 3, "Image Processing Handbook", Shokodo, 1987) to find the matched region 504 to compute a size of the time displacement 506 of the object.

At this point, the method of correlating the framed image 503 in the time sequence image data A501 to the time sequence image data B502 will be explained. For correlating the images, the procedure is to compute the correlation coefficient between the two images, and find a point that lies within a given range of correlation values and has the highest correlation value. Designating the number of pixels in one line by m, the number of lines by n, and the brightness (gradation) of each point within a frame by Ia(i, j). The brightness Ib(t, i, j) designates a brightness of a point in a local region consisting of n-lines that begins at time t within the time sequence image data B412. The average value and variance of each local region are designated by $\mu_a, \mu_b(t), \sigma_a^2, \sigma_b(t)^2$, then the correlation coefficient c(t) of the local regions is given by the following expression.

$$c(t) = \frac{\sum_{j=1}^{n}\sum_{i=1}^{m}(I_a(i,j)-\mu_a)(I_b(t,i,j)-\mu_b(t))}{\sqrt{\sigma_a^2 \sigma_b(t)^2}} \quad (1)$$

The values of c(t) range from −1 to 1, and it approaches 1 as the similarity degree between the two local regions increases. Therefore, matched regions in the time sequence image data B502 are determined by using t as the variable, in other words, by sliding the framed image 503 on the time axis of the time sequence image data B502, and finding a local region that produces a value of c(t) closest to 1.

Here, instead of computing the correlation coefficient, a difference value d(t) according to the following expression may be used.

$$d(t) = \frac{\sum_{j=1}^{n}\sum_{i=1}^{m}|I_a(i,j)-I_b(t,i,j)|}{mn} \quad (2)$$

The closer the d(t) is to 0, the higher the degree of similarity.

Also, if there are insufficient number of lines in the framed image, the probability of error in matching the images increases, and conversely, if there are too many lines, not only the computation time for obtaining the correlation coefficient or difference value increases, but the changes in threshold value or difference value become insensitive and the precision for correlation decreases. Therefore, when the number of pixels per line is about 2048 as in this embodiment, it is preferable that the number of lines within the framed image be 10~20.

Next, using the time interval of the framed images and the corresponding moving distance, a moving speed is obtained (step 403). Specifically, the time displacement, in other words, the moving time interval Tv is obtained from the following expression using the number of moving pixels P and the recording time interval Tc of the line scan camera.

$Tv=P\times Tc$

Therefore, the velocity Vm of the moving object is given by the following expression.

$$Vm = Lr/Tv$$

Here, the measurement precision can be improved by performing the speed measurement as described above for all the framed images, and averaging the obtained results or obtaining representative values of majority values.

As described above, it is possible to determine a moving speed of an object by using two units of line scan cameras.

Next, a processing method will be explained for recognizing a specific shape pattern of a moving object from the time sequence image data processed so as to identify the nature of the moving object.

First, framed image data and specific shape patterns prepared beforehand in the database are extracted on the basis of the moving velocity, and after correcting the scale of the time axis (time scale) using the moving velocity already computed, the degree of similarity is computed (step 405). In this embodiment, the wheel of the vehicle is used as the specific shape pattern to be detected.

Figure 6A:
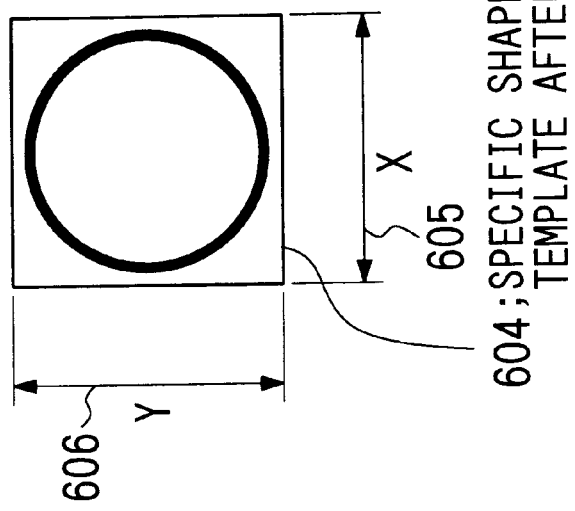
FIGS. 6A, 6B are examples of templates for a specific shape pattern in embodiment 1.
Figure 6B:
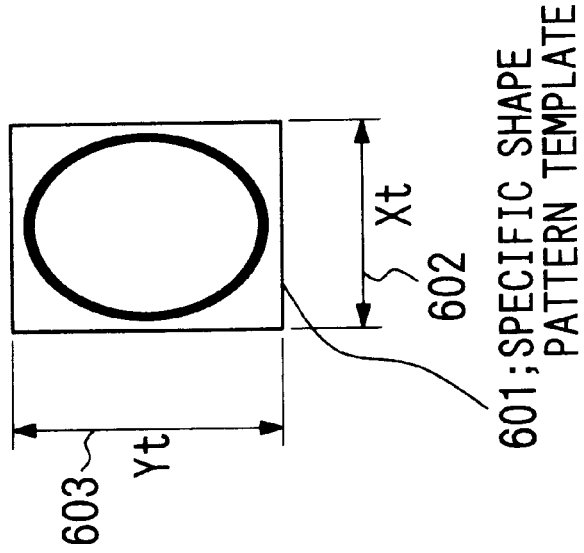

FIG. 6 shows an example of a wheel shape, and 601 refers to a template for a specific shape pattern; 602 to a length Xt in the time axis direction (time duration); 603 to the length Yt in the line axis direction (height); 604 to a template of the specific shape pattern after the correction; 605 to a length X in the time axis direction after correction; and 606 to a length Y in the line axis direction, which remains the same before and after correction. If it is assumed that the template 601 is for the specific shape pattern of the time sequence image data recorded at an interval Ttc, then $$X = Xt \times Ttc/Tc,$$

so that the time scales can be matched in the two image data. In the meantime, the scale in the line axis direction can vary depending on how far object is from the line scan cameras A recording the object. Therefore, the line scale of the template of the specific shape pattern in the line axis direction is increased or decreased to match the scales in the two images. After which, the degree of similarity is obtained by computing the difference value or correlation coefficient (refer to reference 3), and when a higher degree of similarity than a certain value of similarity is obtained, it is considered that a match has been obtained. In this embodiment, the template for the specific shape pattern was corrected to match the time scales, it is permissible to correct the time sequence image data, or to correct both the template and the time sequence image data.

Next, the pattern is recognized using the degree of similarity, and the stationary vehicle is recognized (step 406). By applying the threshold processing technique to the degree of similarity obtained in step 405, the wheel represented by the specific shape pattern is recognized. Therefore, if a wheel is detected within the time sequence image data, it means that the stationary object is a stationary vehicle. Accordingly, a stationary object can be recognized using the time sequence image data produced from the two line scan cameras.

This embodiment presented a case of a stationary object and a moving observer, but it is possible to determine a relative moving speed by using a similar method when both subjects are moving. Also, the explanation was provided for a case of wheel representing a specific shape pattern, but it is possible to recognize license plates attached to the front and back of the vehicle by correcting the scale in the time axis direction according to the moving speed. This will be discussed later.

Embodiment 2

Measurements of speed and length, a method for recognizing a pattern and embodied examples of the apparatus in Embodiment 2 will be explained in the following. In this embodiment, a measuring point having two units of line scan cameras, as an example of a plurality of line scan cameras, are disposed in a fixed point of observation to perform speed and length measurements and pattern recognition of vehicles moving along a given track. The measuring apparatus used in this embodiment is the same as the one used in Embodiment 1 (refer to FIG. 1).

Figure 7:
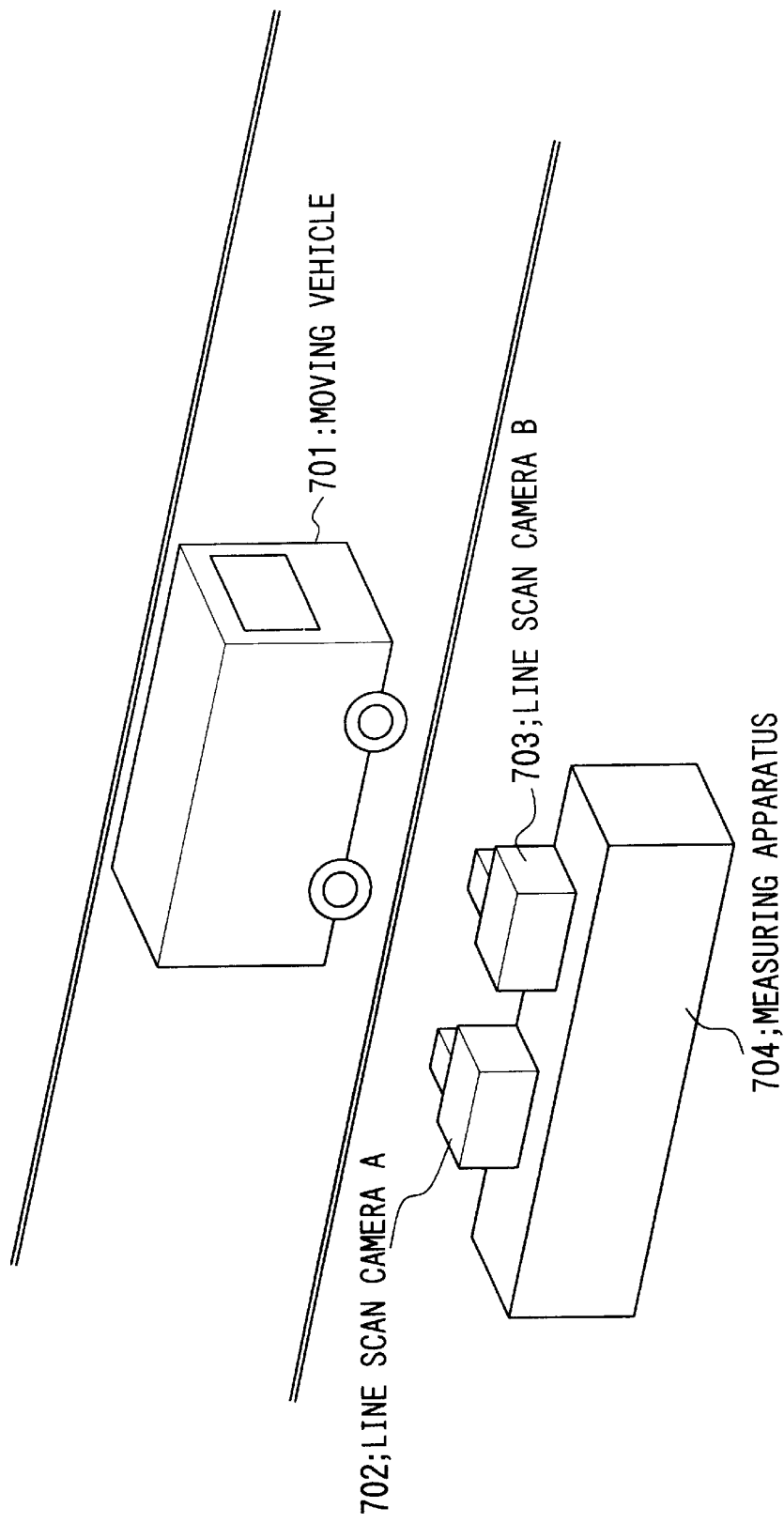
FIG. 7 is a diagram of an example of the measuring system for measuring a moving vehicle in Embodiment 2.

FIG. 7 shows an example of the apparatus for performing speed and length measurements and pattern recognition in Embodiment 2, and 701 refers to a moving vehicle; 702 to a line scan camera A; 703 to a line scan camera B, 704 to a measuring apparatus.

Figure 8:
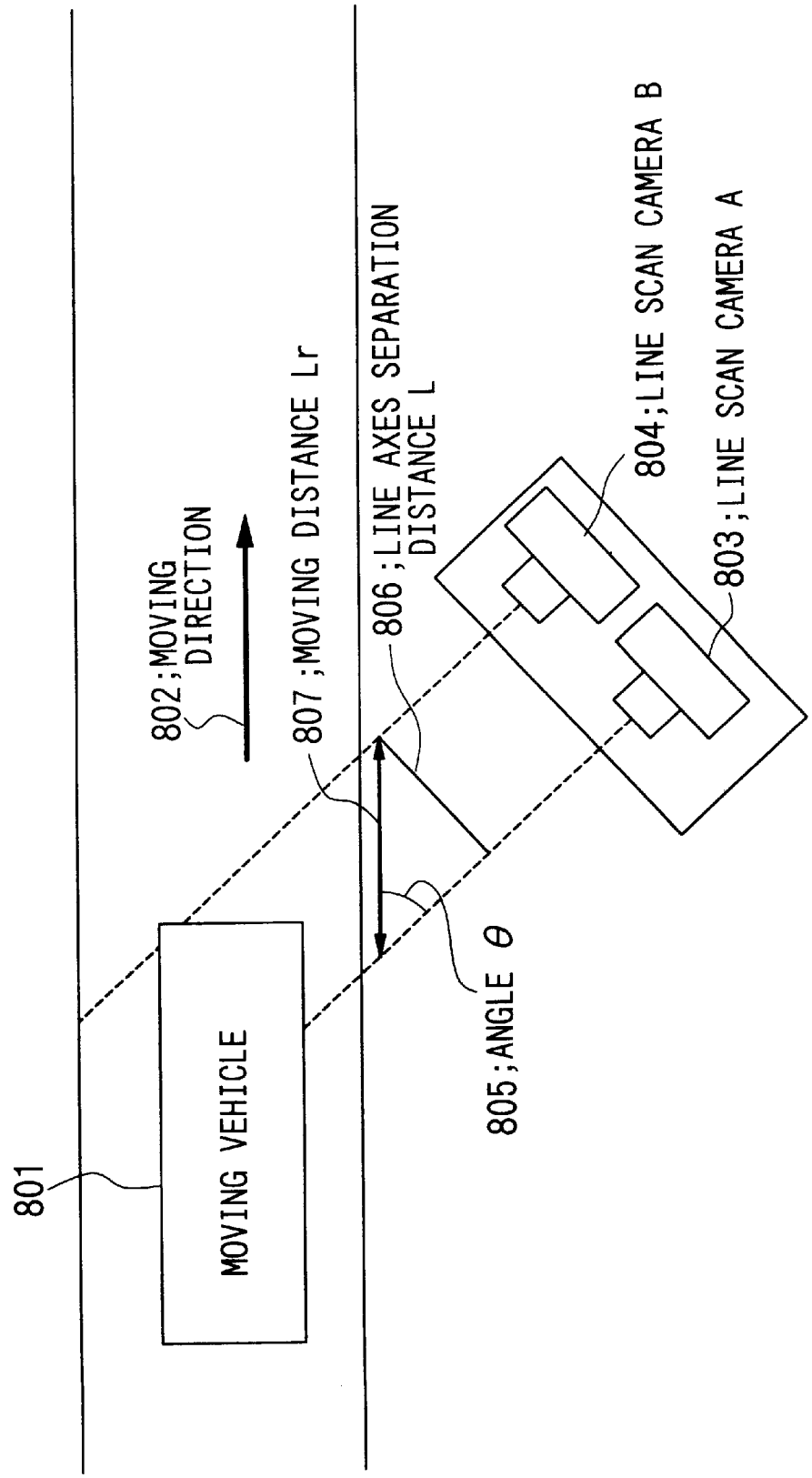
FIG. 8 is top view of the measuring system shown in FIG. 7.

FIG. 8 shows a top view of the measuring system shown in FIG. 7, and 801 refers to a moving vehicle; 802 to the moving direction; 803 to a line scan camera A; 804 to a line scan camera B; 805 to an angle θ; 806 to a line axes separation distance L; and 807 to a moving distance Lr. The moving direction of the moving vehicle 801 is defined as the moving direction 802, and the line scan camera A803 and the line scan camera B804 are disposed at an angle θ with respect to the moving direction 802. In this arrangement, the true distance Lr807 of the vehicle moving along the given track between the line axes is given the expression below.

$$Lr = L/\sin(\theta)$$

Figure 9:
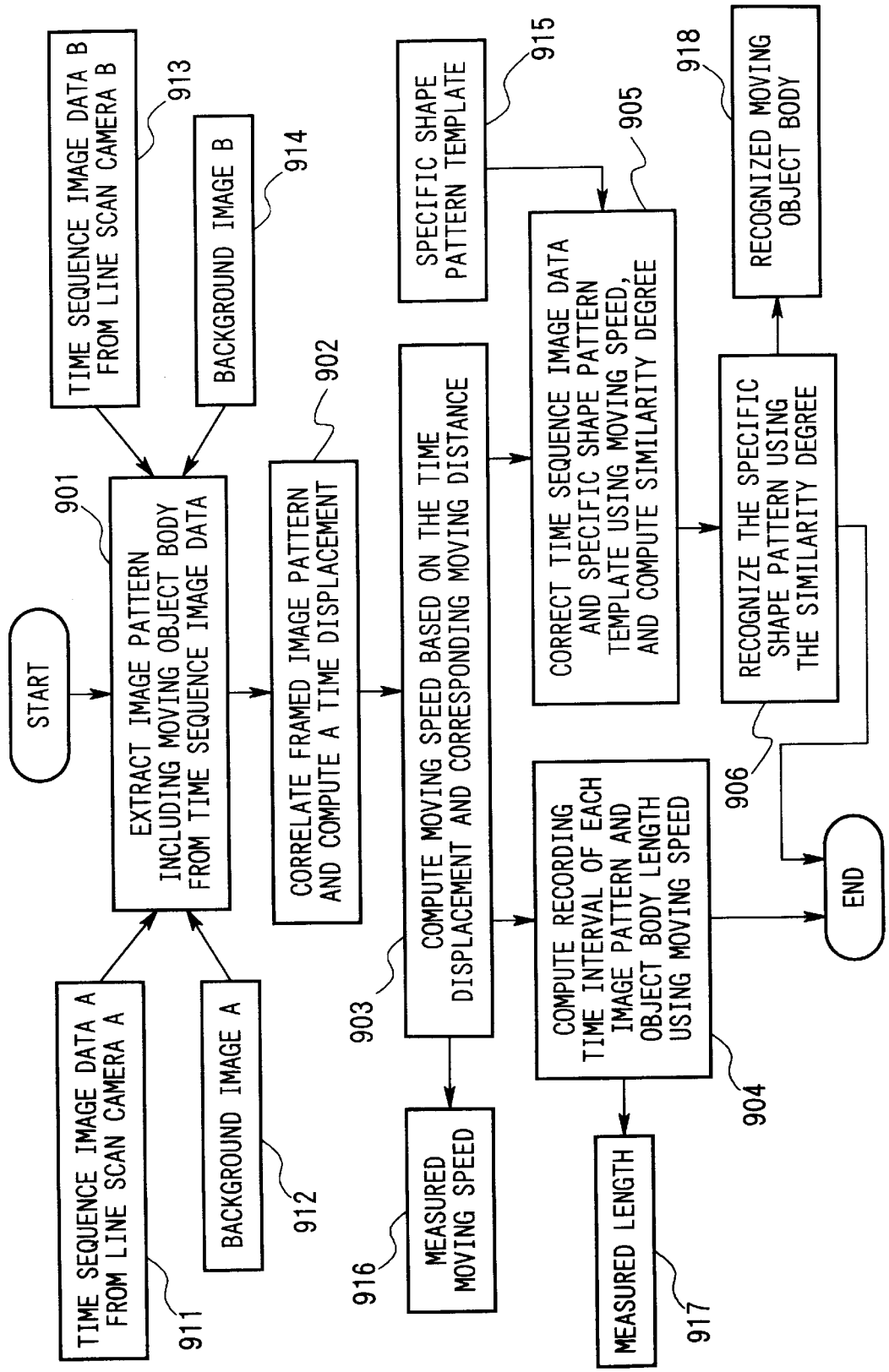
FIG. 9 is a flowchart of the process of speed and length measurements and pattern recognition in Embodiment 2.

FIG. 9 is a flowchart for the method of speed and length measurements and pattern recognition, and processing between step 901 to step 906 shown in FIG. 9 is executed by the information processing device 101 such as CPU of a personal computer and the like. The method of speed and length measurements and pattern recognition will be explained in the following with reference to the flowchart in FIG. 9.

Initially, a moving speed of the moving vehicle is obtained.

First, an image pattern that includes the moving vehicle 801 is extracted from time sequence images 911, 913 recorded at a given scanning timing using the line scan camera A803 synchronized to the line scan camera B804 (step 901). Images without the moving vehicles are recorded beforehand using the line scan camera A803 and the line scan camera B804, and are accumulated in the image accumulation section 107 as background image A912 and B914.

Figure 10:
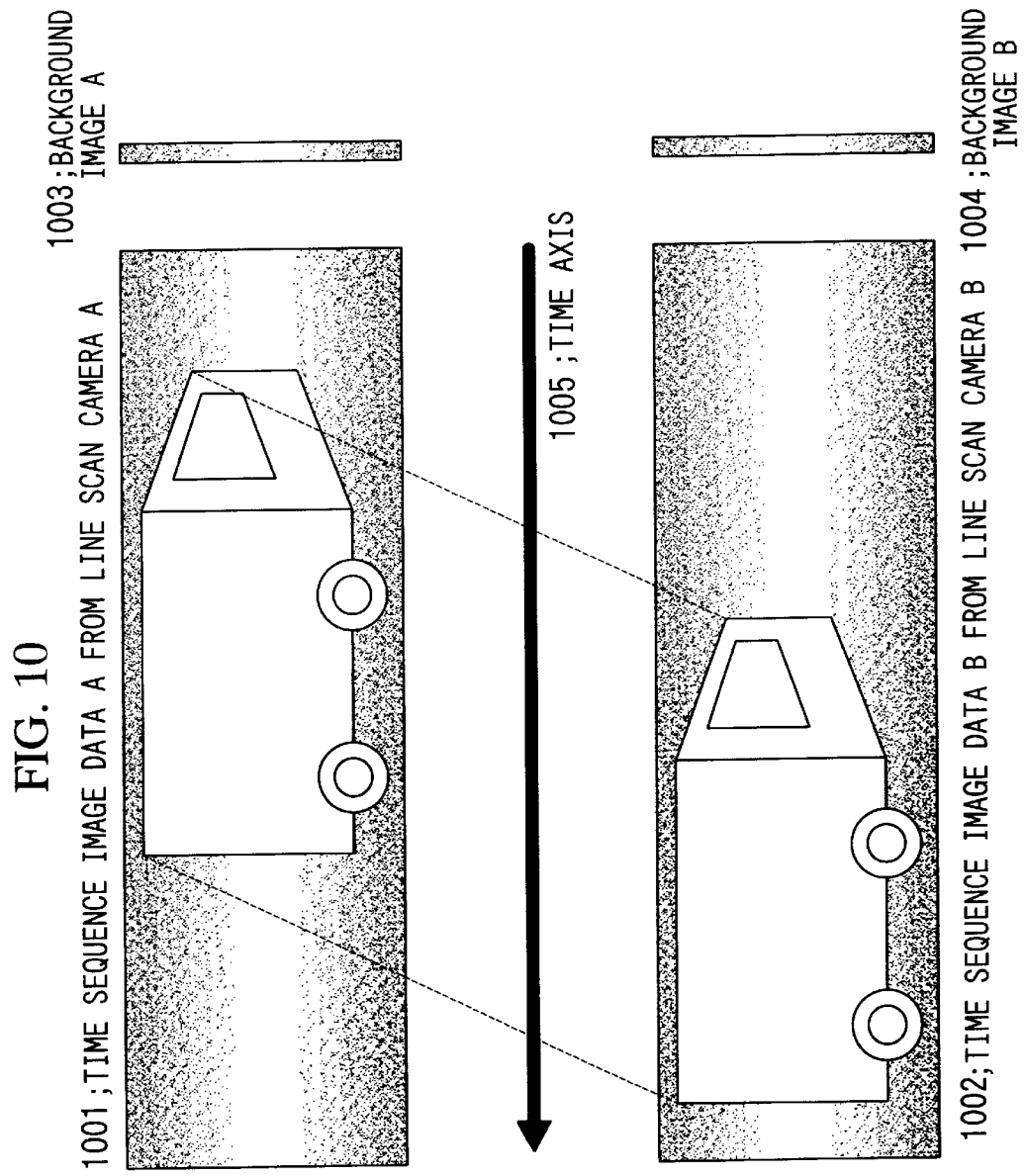
FIG. 10 shows examples of the output images from line scan cameras in Embodiment 2.

FIG. 10 shows examples of the time sequence image data recorded by the line scan cameras, and 1001 refers to time sequence image data A recorded by the line scan camera A; 1002 to time sequence image data B recorded by the line scan camera B; 1003 to a background image A of the line scan camera A; 1004 to a background image B of the line scan camera B; and 1005 to the time axis. Background images A1003, B1004 are images having a width comprised by one line or several lines. Because the observation point is stationary in this embodiment, images such as those shown by time sequence image data A1001 and B1002 formed by the moving vehicle 801 superimposed on the contiguous background images are obtained. Therefore, by performing difference value computation involving the background image or correlation coefficient computation (refer to reference 3) for every one line of several lines, it is possible to perform threshold computation and labeling processing (refer to reference 3) using the values thus obtained, thereby enabling to extract regions different from the background, that is, an image pattern containing the moving object. However, the background images can change depending on the illumination conditions, and therefore, background images may in some cases be renewed as necessary. The foregoing expression (1) or (2) can be used to compute the above-mentioned difference value or correlation coefficient.

Next, the extracted image pattern is correlated to time sequence images so that time displacement of the image pattern can be obtained (step 902).

Figure 11:
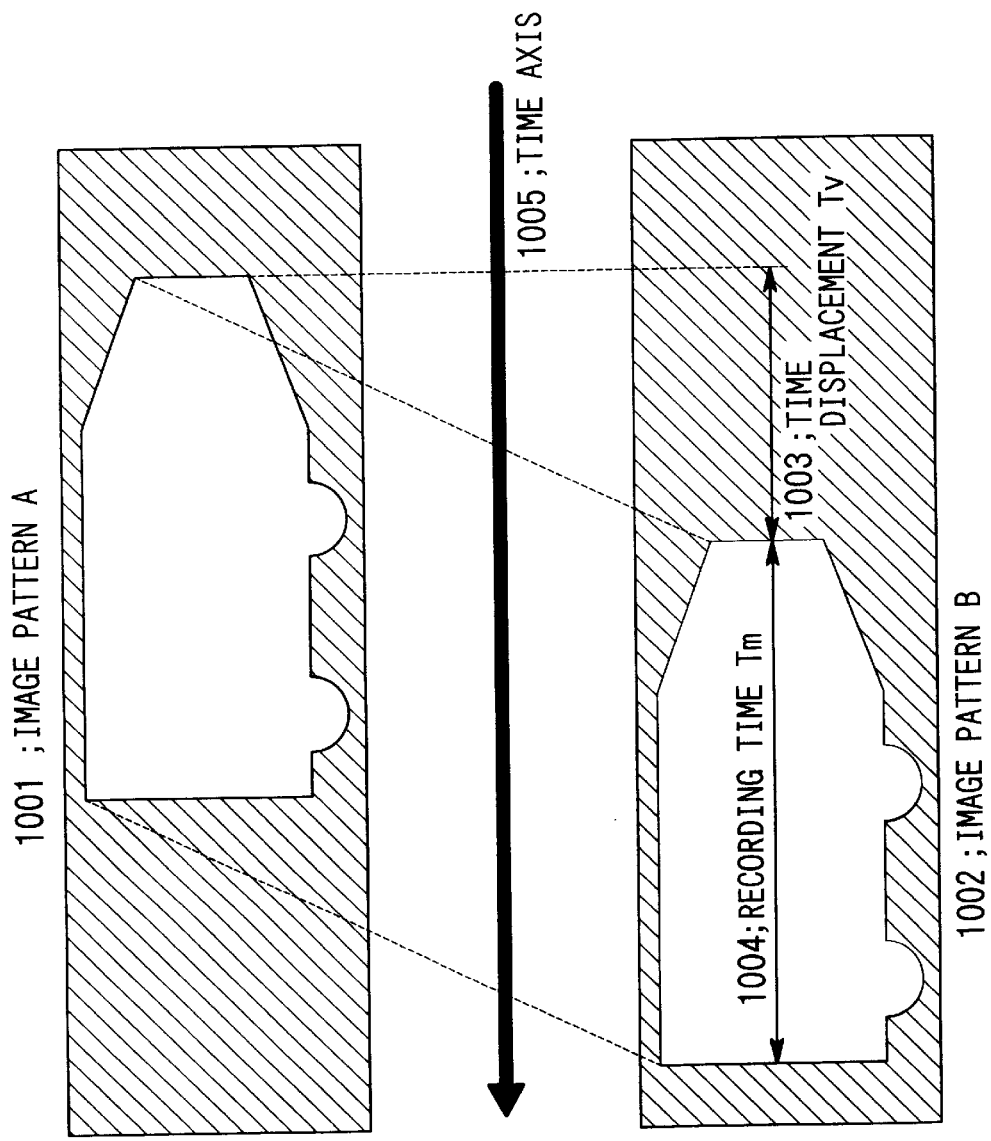
FIG. 11 is a side view of the results of image pattern extraction in Embodiment 2.

FIG. 11 shows an example of the image pattern extracted from the time sequence image data, and 1101 refers to an image pattern A in the time sequence image data A; 1102 to an image pattern in the time sequence image data B; 1103 to a moving time interval Tv, 1104 to a recording time interval Tm; and 1105 to the time axis. First, image patterns are correlated. Specifically, correlation is made according to difference value computation between the image patterns or correlation computation (refer to reference 3). After correlation is finished, the value of time displacement between the correlated image patterns, that is, the moving time interval Tv 1103 for moving distance Lr807 is obtained.

Next, the moving speed is obtained from the value of the time displacement of the image patterns and the corresponding moving distance (step 903). Specifically, the value of the time displacement, that is, the moving time interval Tv is obtained according to the number of moving pixels P of the image pattern in the time sequence image data and the recording time interval Tc of the line scan camera using the following expression.

$$Tv = P \times Tc$$

Therefore, the moving velocity Vm of the moving object is give by the following expression.

$$Vm = Lr/Tv$$

As described above, it is possible to determine a moving speed of an object by using two units of line scan cameras.

Next, a length of the moving object is obtained using the recording time interval and the moving time interval of the moving image patterns (step 904). The image recording time Tm1104 relates to the starting point and the ending point of the image pattern on the time axis. Therefore, the length of the moving object Lm is given by the following expression.

$$Lm = Vm \times Tm$$

Figure 12:
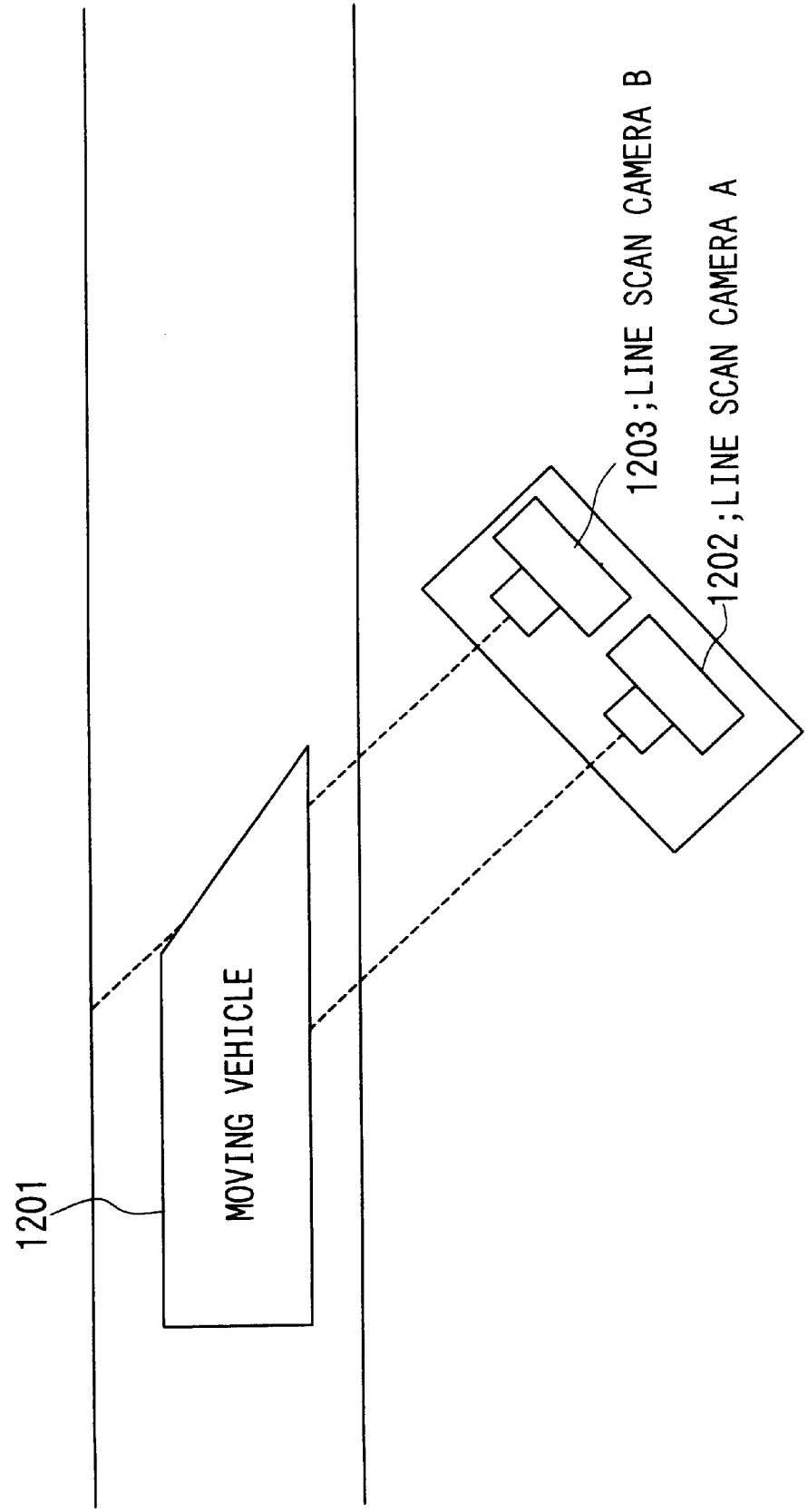
FIG. 12 is a top view of an example of the system for measuring a moving vehicle in Embodiment 2.
Figure 13:
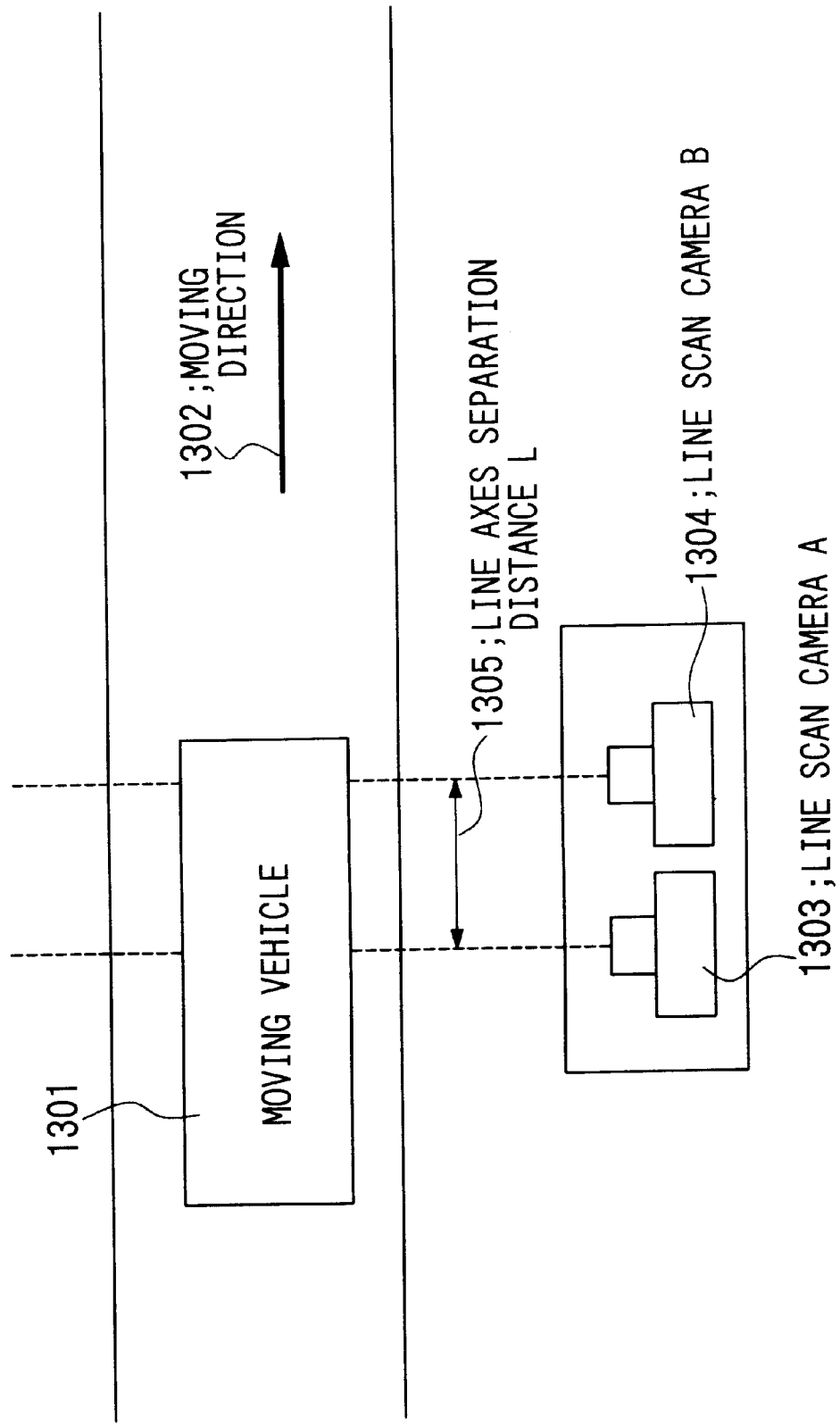
FIG. 13 is a top view of an example of the system for measuring a moving vehicle in Embodiment 2.

In general, when the angle θ 805 based on the reference direction using the moving direction 802 is an angle other than 0, both the side and the front of the vehicle are recorded, as shown in FIG. 10, so that it is not possible to obtain a correct length of the moving object in the moving direction. However, as shown in FIG. 12, even if the angle θ is an angle other than 0, if only the side view of the object is being recorded, and the two side surfaces are parallel to the moving direction, it is possible to obtain a length of the object correctly in the moving direction. When measuring the length of the object, time sequence image data are taken from those recorded by setting the angle θ 805 to zero (refer to FIGS. 13, 14).

Next, pattern recognition of a specific shape pattern belonging to the moving object is recognized from the time sequence image data so as to identify the moving object.

First, the image data and specific shape patterns prepared beforehand in the database and the like are extracted on the basis of the moving speed, and after correcting the time scale using the moving speed already computed, the degree of similarity is computed (step 905). In this embodiment, wheels are used as the specific shape pattern to be detected as in Embodiment 1. As in the step 405 shown in Embodiment 1, the degree of similarity is obtained in this embodiment also.

Next, using the degree of similarity, the pattern is recognized and the moving vehicle is identified (step 906). Therefore, by applying the threshold processing technique to the degree of similarity obtained in step 905, the wheel represented by the specific shape pattern is recognized. Therefore, if a wheel is detected within time sequence image data, it means that the moving object is a moving vehicle. Accordingly, a moving object can be recognized using the time sequence image data produced from two line scan cameras.

Embodiment 3

Measurements of speed and a method for recognizing a pattern and embodied examples of the apparatus in Embodiment 3 will be explained in the following. In this embodiment, a measuring point having two units of line scan cameras, as an example of a plurality of line scan cameras, are disposed in a fixed point of observation to perform speed and pattern recognition of moving vehicles. The measuring apparatus used in this embodiment is the same as the one used in Embodiment 2 (refer to FIGS. 7, 8).

Figure 15:
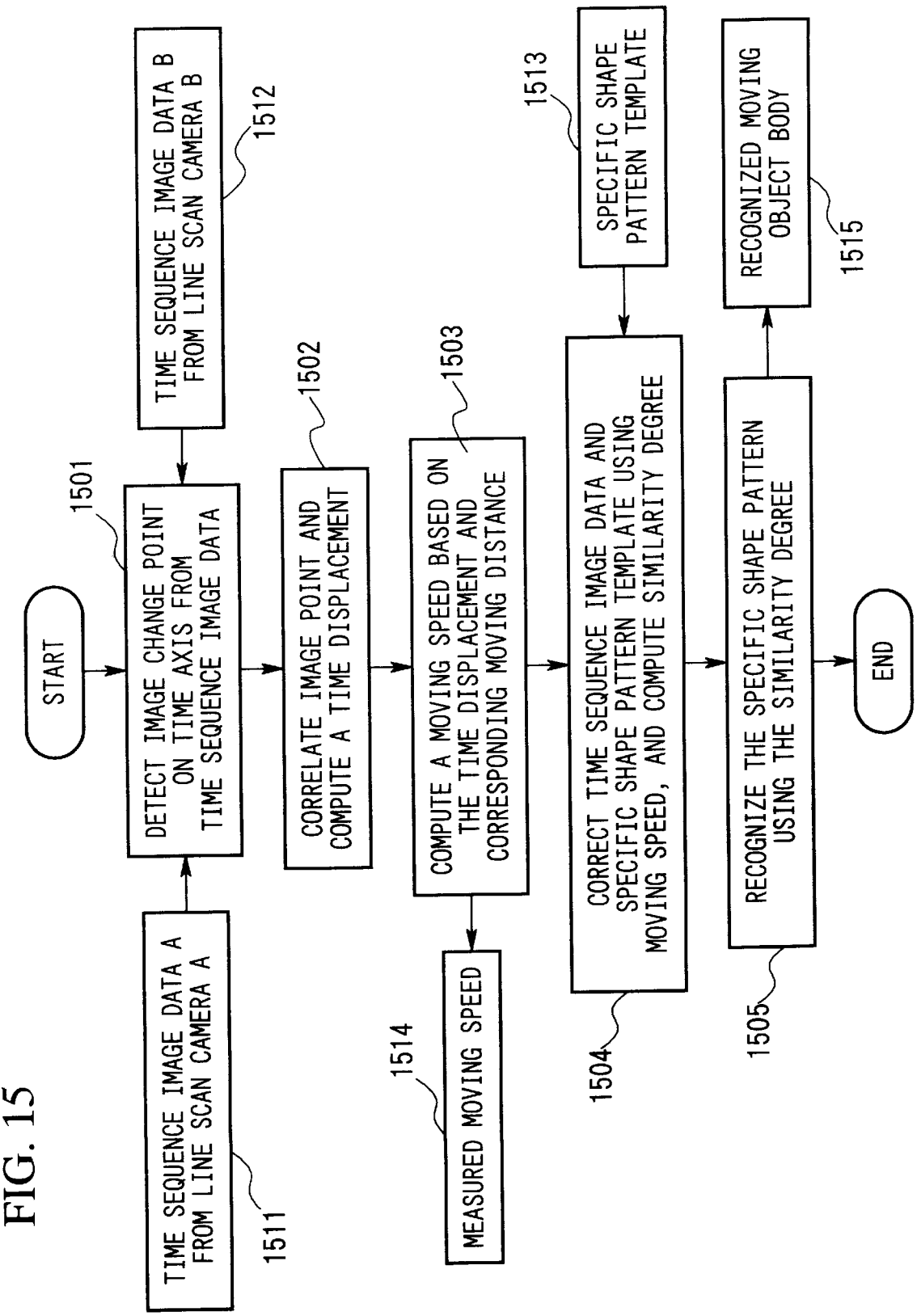
FIG. 15 is a flowchart of the process of speed measurement and pattern recognition in Embodiment 3.

FIG. 15 is a flowchart for a method of speed and pattern recognition in this embodiment, and processing between step 1501 to step 1505 is executed by the information processing device 101 such as CPU of a personal computer. The method of speed and pattern recognition will be explained in the following with reference to the flowchart in FIG. 15.

Initially, a moving speed of the moving vehicle is obtained as described below.

First, an image change point on the time axis is detected from the time sequence image data 1511, 1512 (step 1501). Here, the time sequence image data are obtained as in Embodiment 2. FIG. 16 shows a graph of an example of the chronological change in the time sequence image data, and 1601 refers to the time sequence image data A recorded by the line scan camera A; 1602 is graph to show the chronological change in the amount of change between two consecutive 1-line images; 1603 to an image change point; 1604 to a threshold value of the change; and 1605 to the time axis. Because the observation point is fixed in this embodiment, when there is no moving object, there is hardly any chronological change in the image. On the other hand, a large change takes place in the image when the moving vehicle begins to pass a detection point. Therefore, by performing difference value computation or correlation coefficient computation (refer to reference 3), it is possible to obtain chronological change 1602 in the amount of image change. Designating the number of pixels in one line by m, the brightness of each point in the line at time t by I(t, i), and the line scanning interval by $t_0$, the above-mentioned chronological change e(t) is given by the following expression.

$$e(t) = \frac{\sum_{i=1}^{m} |I(t, i) - I(t - t_0, i)|}{m} \quad (3)$$

Threshold processing of the amount of change using the threshold value 1604 enables to determine an image change point 1603. Similar processing is performed on the time sequence image data B1512 recorded by the line scan camera B to obtain an image change point.

Next, the image change points are correlated and the time displacement values are computed. As in this embodiment, when the moving direction of the moving vehicle is given, the object crosses the line scan camera A first and then the line scan camera B next. Therefore, an image change point is detected in the time sequence image data A, and an image change point obtained immediately afterward from the time sequence image data B can be designated as the starting point of the image pattern of the moving vehicle. Even when the moving direction of the vehicle is unknown, an image change point nearby can be designated as the starting point or an ending point of the image pattern of the moving vehicle. When the correlation is completed, moving velocity of the moving object can be computed from the moving time interval and the actual distance of move as in Embodiment 2.

The pattern recognition processing from step 1594 to step 1505 are performed as in Embodiment 2.

Embodiment 4

Measurements of speed, length and a method recognizing a pattern and embodied examples of the apparatus in Embodiment 3 will be explained in the following. In this embodiment, a measuring point having two units of line scan cameras, as an example of a plurality of line scan cameras, which are disposed in a fixed point of observation to perform speed and pattern recognition of moving vehicles. The measuring apparatus used in this embodiment is the same as the one used in Embodiments 2, 3 (refer to FIGS. 7, 8).

Figure 17:
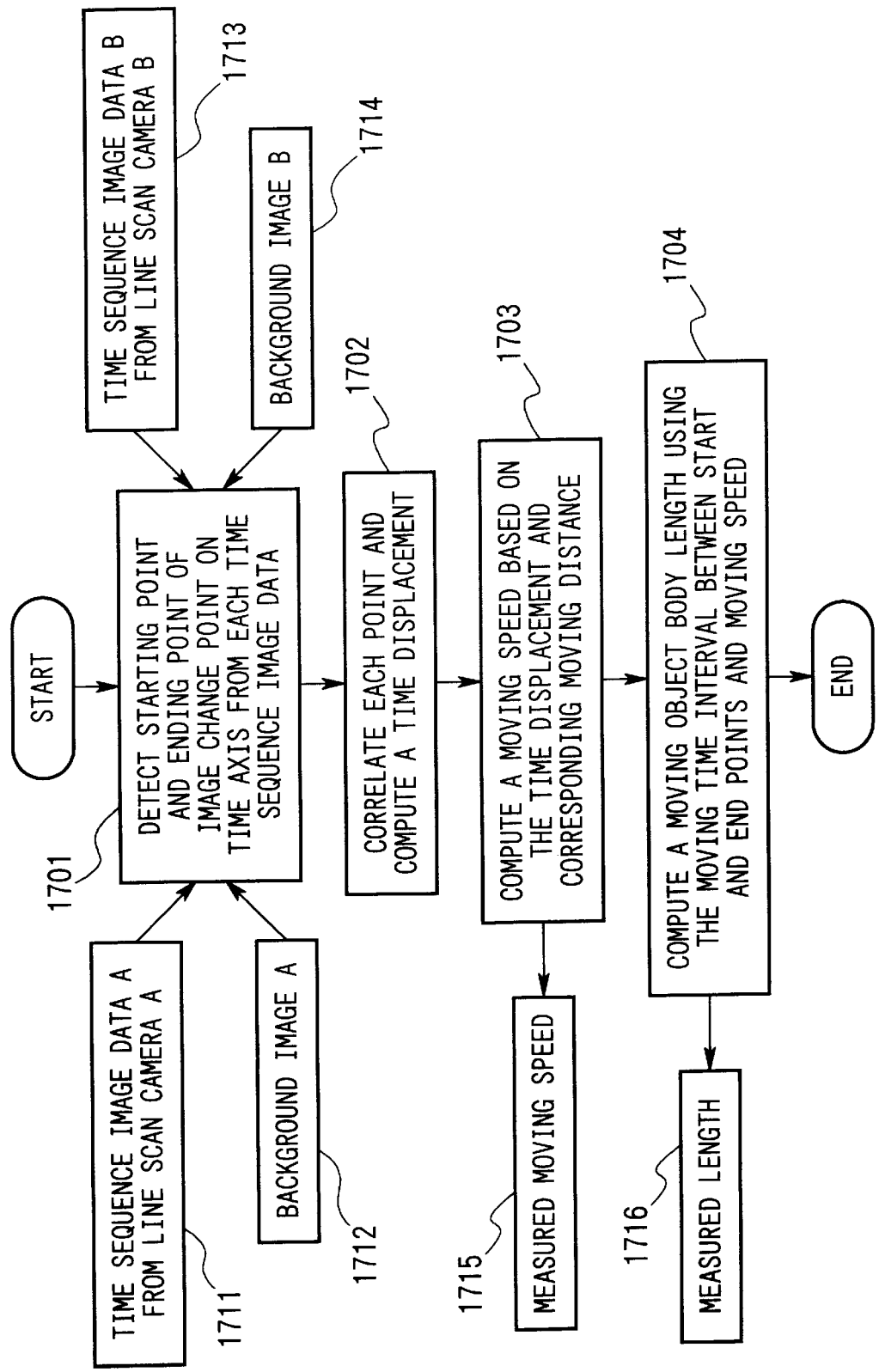
FIG. 17 is a flowchart of the process of speed and length measurements and pattern recognition in Embodiment 3.

FIG. 17 is a flowchart for a method of speed and length measurements in this embodiment, and processing between step 1701 to step 1704 is executed by the information processing device 101 such as CPU of a personal computer. The method of speed and length measurements will be explained in the following with reference to the flowchart in FIG. 17.

Initially, a moving speed of the moving object is obtained. First, the starting point and the ending point of image change on the time axis between the background image in each time sequence image data 1711, 1713 is obtained as in Embodiment 2 (step 1701).

Figure 18:
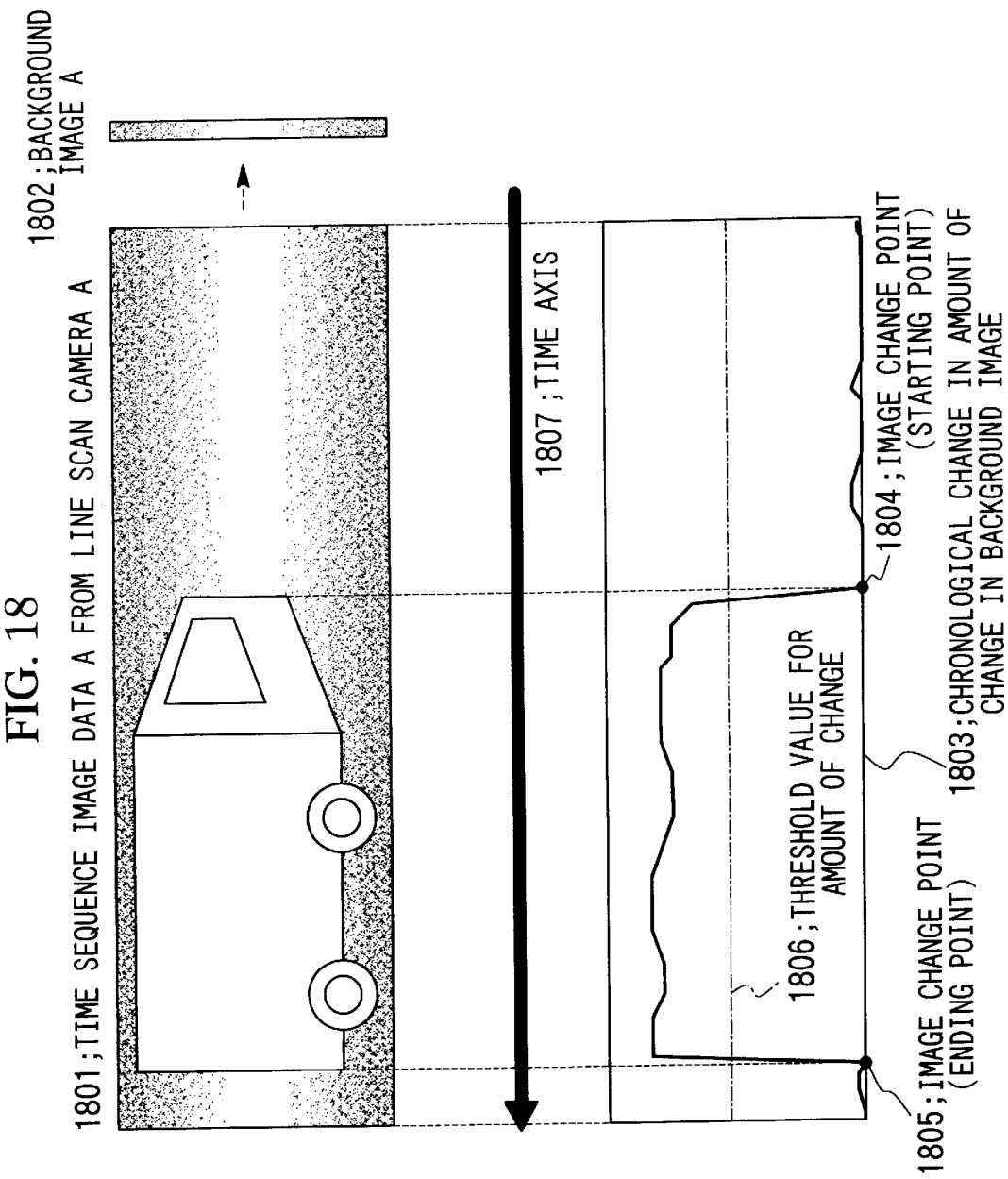
FIG. 18 is an example of the output image from the line scan camera in Embodiment 4 and a graph showing the amount of change in the image.

FIG. 18 shows an example of the chronological change in the amount of image change between the time sequence image data and the background image, and 1801 refers to the time sequence image data A recorded by the line scan camera A; 1802 to a background image A; 1803 to a chronological change in the amount of image change from the background image; 1804 to an image change point (starting point); 1805 to an image change point (ending point); 1806 to a threshold value for the amount of change; and 1807 to the time axis. Because the observation point is fixed in this embodiment, when there is no moving object, there is hardly any chronological change in the image. On the other hand, a large change takes place in the image when the moving vehicle begins to pass. Therefore, by performing difference value computation or correlation coefficient computation (refer to reference 3), it is possible to obtain chronological change 1803 in the amount of image change. Threshold processing of the amount of change using the threshold value 1806 enables to determine an image change point (starting point) 1804 and an image change point (ending point) 1805. Similar processing is performed on the time sequence image data B1713 recorded by the line scan camera B to obtain an image change point.

Next, the image change points are correlated and the time displacement values are computed. In this embodiment, the starting point and the ending point of image change are considered as a combined pair of image change points. As in this embodiment, when the moving direction of the moving vehicle is given, the object crosses the line scan camera A first and then the line scan camera B next. Therefore, an image change point is detected in the time sequence image data A, and an image change point obtained immediately afterward from the time sequence image data B can be designated as the combined pair of starting point and the ending point of the image pattern of the moving vehicle. Even when the moving direction of the vehicle is unknown, an image change point pair nearby can be designated as the starting point and an ending point of the image pattern of the moving vehicle. When the correlation is completed, moving velocity of the moving object can be computed from the moving time interval and the actual distance of move as in Embodiment 2.

The length measurement processing in step 1704 is performed in the same manner as in Embodiment 2, because the time between the starting and ending points is identical to the recording time of the moving object.

Figure 19:
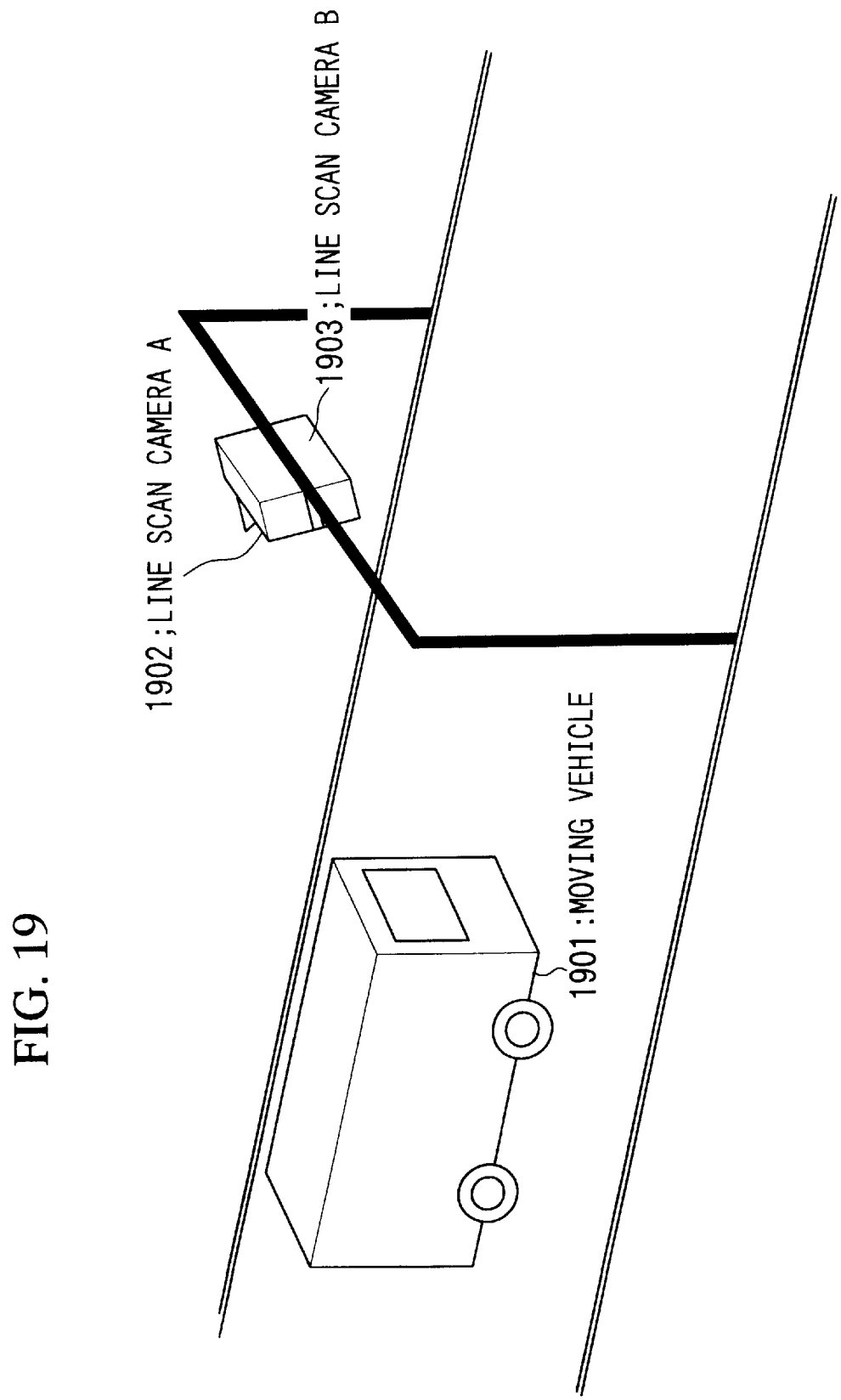
FIG. 19 is a perspective view of an example of the system for measuring a moving vehicle in Embodiments 2, 3 and 4.
Figure 20:
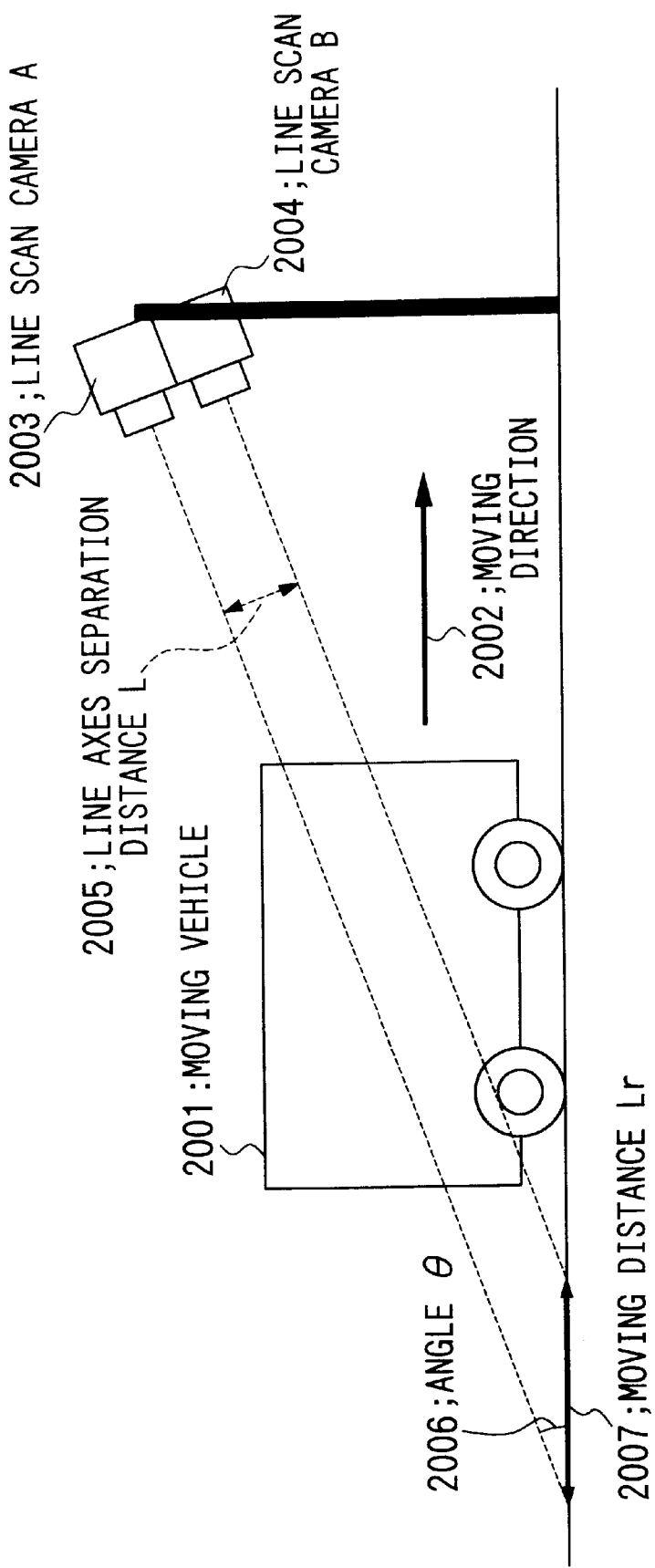
FIG. 20 is a side view the measuring system shown in FIG. 18.
Figure 21:
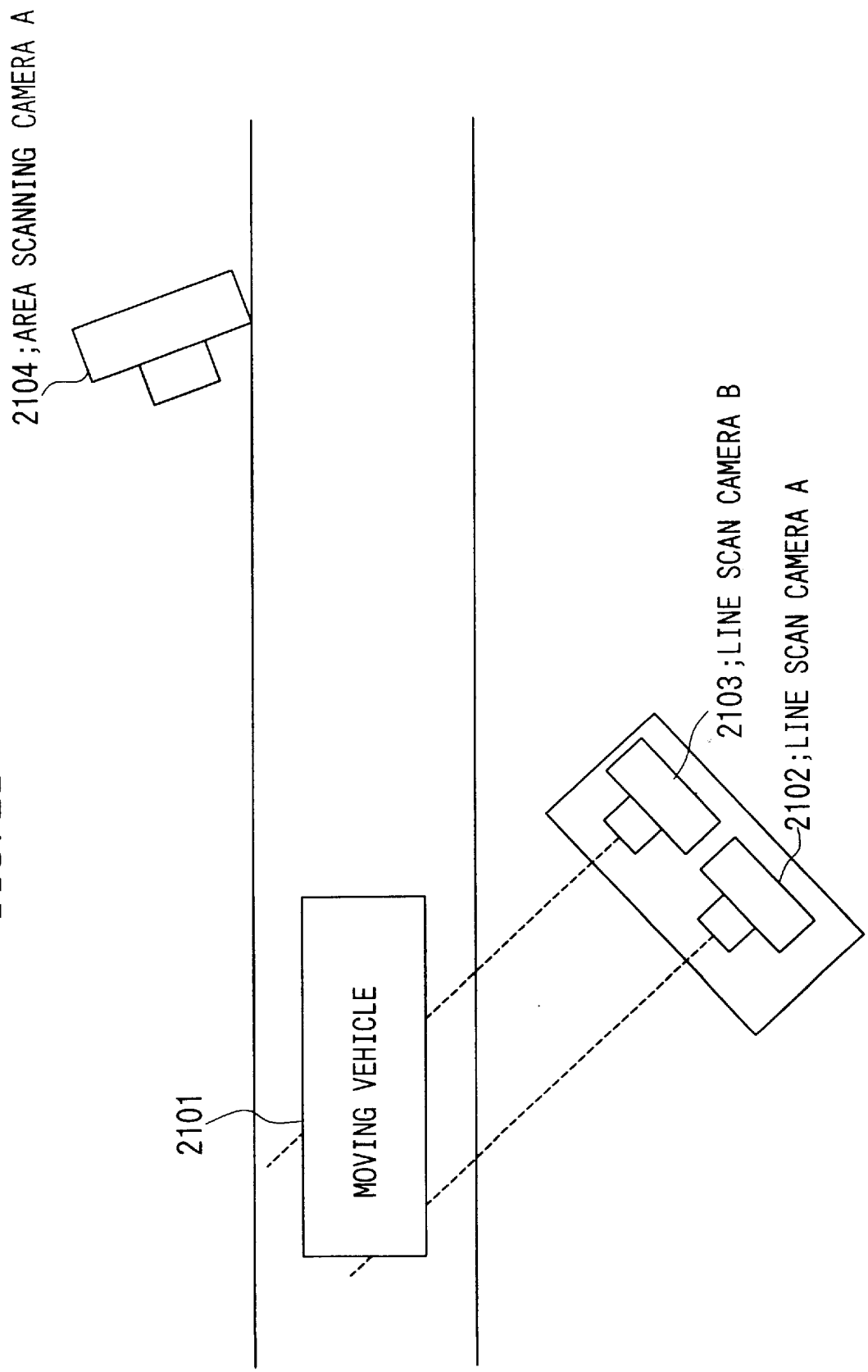
FIG. 21 is a top view of an example of the system for measuring a moving vehicle in Embodiments 2, 3 and 4, and recording the measurement results in synchronization with the output of the area sensors.
Figure 22:
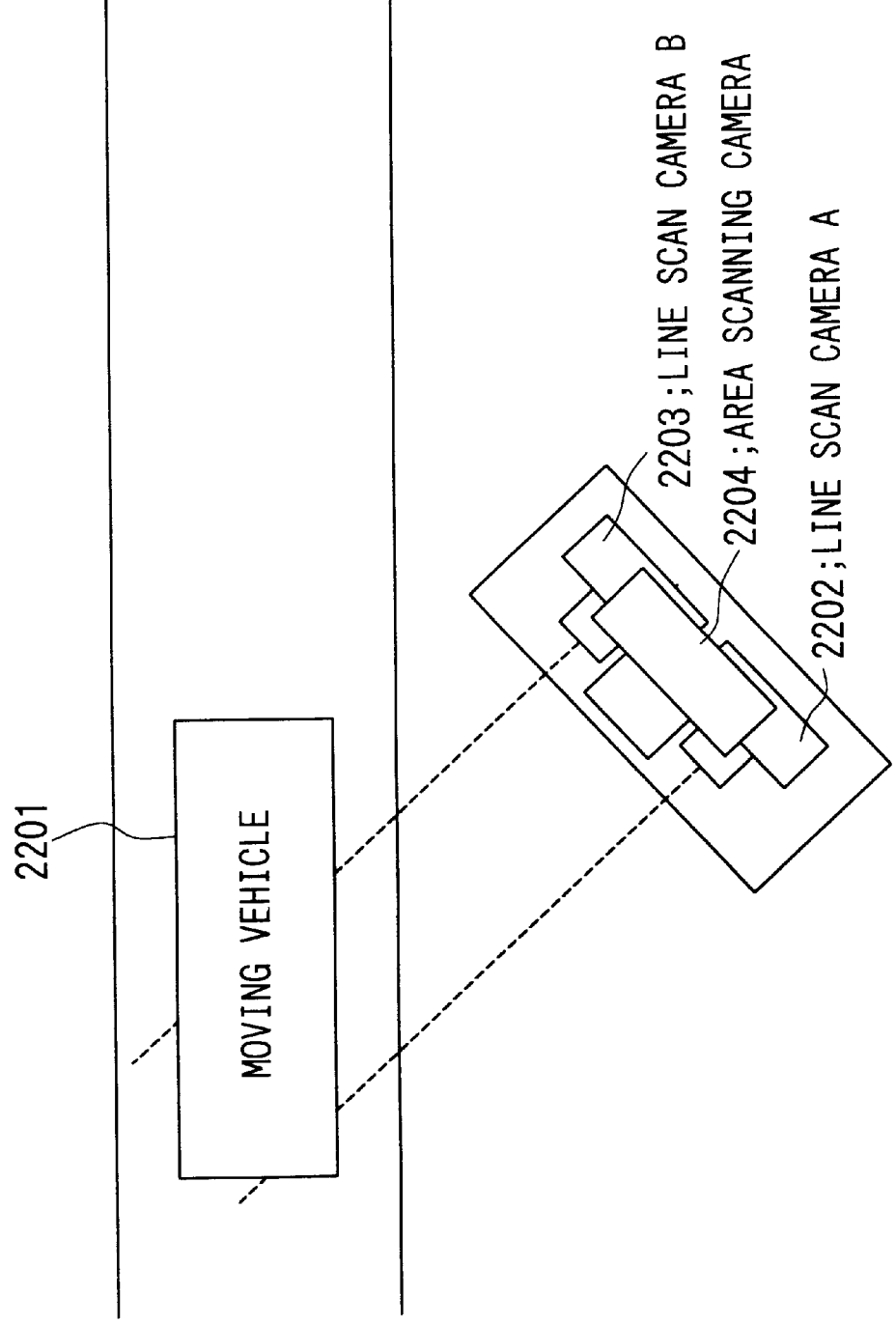
FIG. 22 is a top view of another example of the system for measuring a moving vehicle in Embodiments 2, 3 and 4, and recording the measurement results in synchronization with the output of the area sensors.

In the above Embodiments 2, 3 and 4, the side view of the object was used, but as shown in FIGS. 19, 20, the method is applicable to a case of images recorded by the line scan cameras A1902, 2003 and the line scan cameras B1903, 2004 which are disposed on the upper section of the moving vehicles 1901, 2001. Also, as shown in FIGS. 21, 22, to accumulate the processing results, line scan cameras A2102, 2202 and the line scan camera A303 line scan cameras B2103, 2203 are synchronized with the area scan cameras 2104, 2204, and the stationary image and video images recorded by the moving objects (moving vehicles 2101, 2201) may be displayed or recorded. Also, two units of line scan cameras were used, but more than 2 units of line scan cameras may be provided.

Embodiment 5

Next, an application of the present method of speed measurement to a speeding vehicle monitoring system will be explained. In this embodiment, two units of line scanning cameras assigned to the respective observation points are fixed, and speed measurement of the moving vehicle and license plate recognition are performed.

Figure 23:
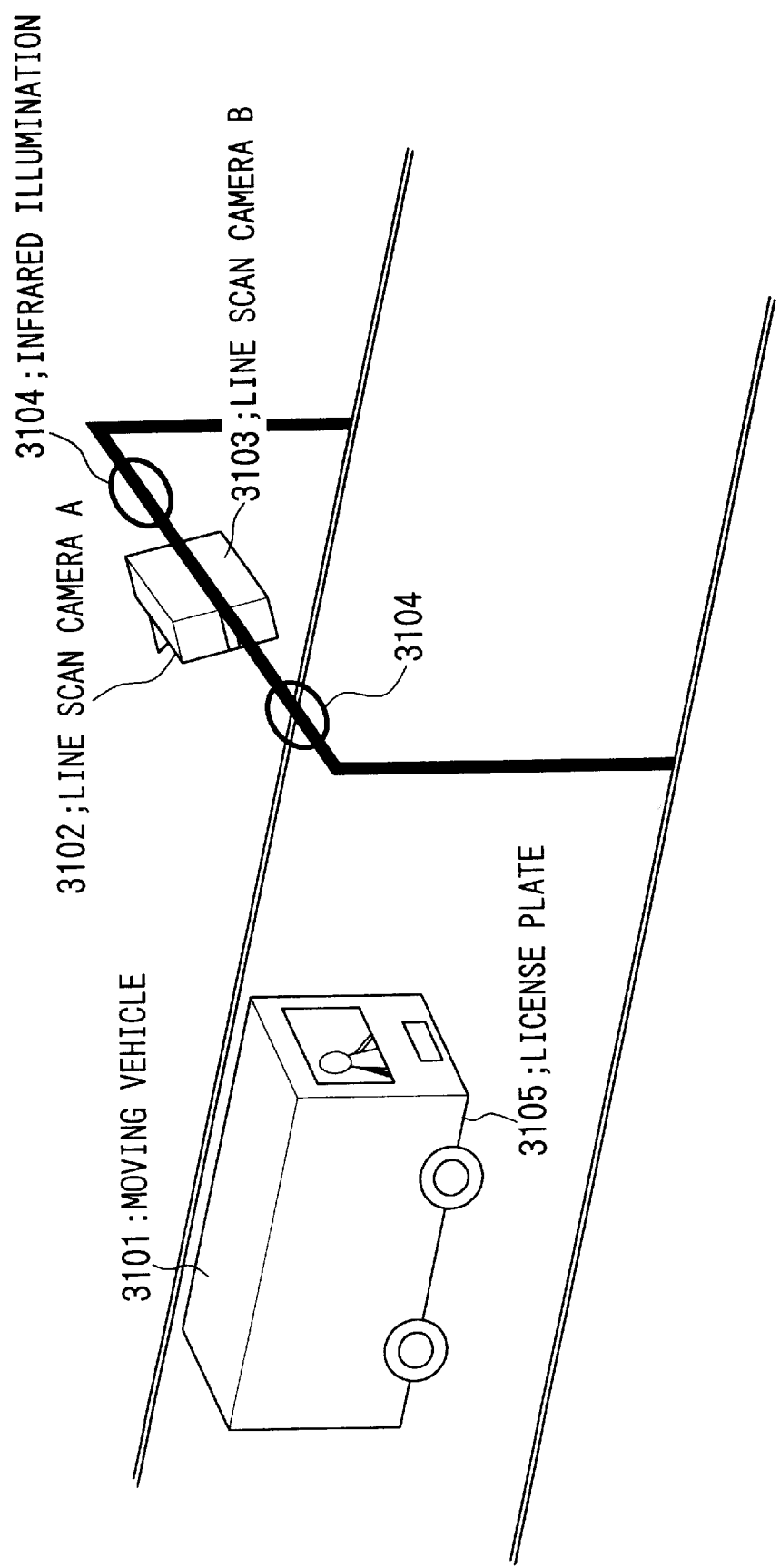
FIG. 23 is a perspective view of an arrangement of the apparatus for measuring the speed of a moving vehicle and recognizing a license plate in Embodiment 5.

FIG. 23 shows an example of the speeding vehicle monitoring system in the present embodiment. The line scan camera A3102, a line scan camera B3103 and an infrared illumination 3104 are disposed above the gantry so as to enable a speeding car to be recorded from above. The line axes of the line scan camera A3102 and the line scan camera B3103 are disposed parallel to each other, and are synchronized so as to record at a constant line scanning cycle. Also, the line scan camera A3102 and the line scan camera B3103 are each provided with a polarizing filter for suppressing scattered reflection from the front glass and to enable to record an image of the driver, as well as a visible light blocking filter (infrared transmissive filter) to enable to record the images any time of the day or night.

Figure 24:
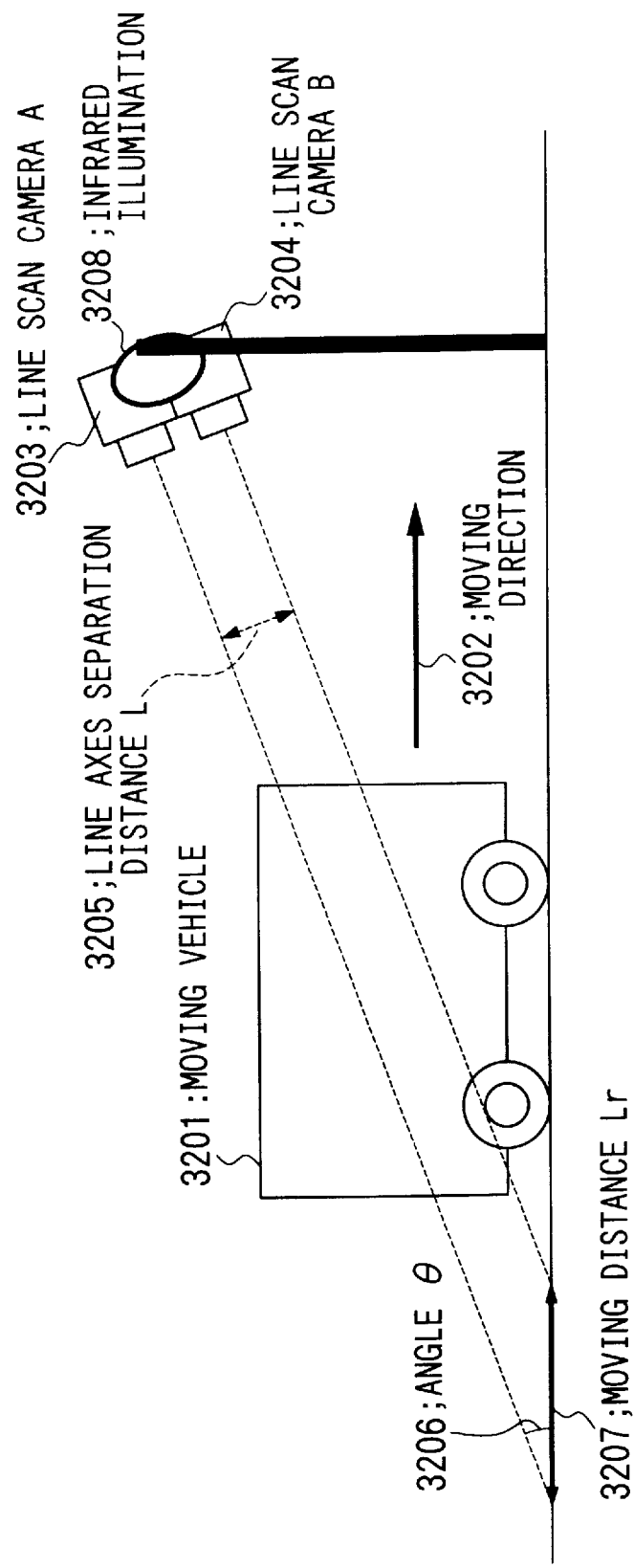
FIG. 24 is a side view of an example of speed measurement of a moving vehicle in Embodiment 5.

FIG. 24 shows a side view of the system shown in FIG. 23, and the line scan camera A3203 and the line scan camera B3204 and the infrared illumination 3208 are oriented downward at and angle θ with respect to the ground. In such a case, the moving distance Lr of the moving vehicle between the line scan camera A and the line scan camera B is given by the following relation.

$Lr=L/\sin(\theta)$

FIG. 25 shows an example of the time sequence images obtained by the line scan camera A and the line scan camera B. As shown in this diagram, the apparatus is capable of recording a driver and a license plate by placing the line scan cameras so as to view from the top to the bottom.

Figure 26:
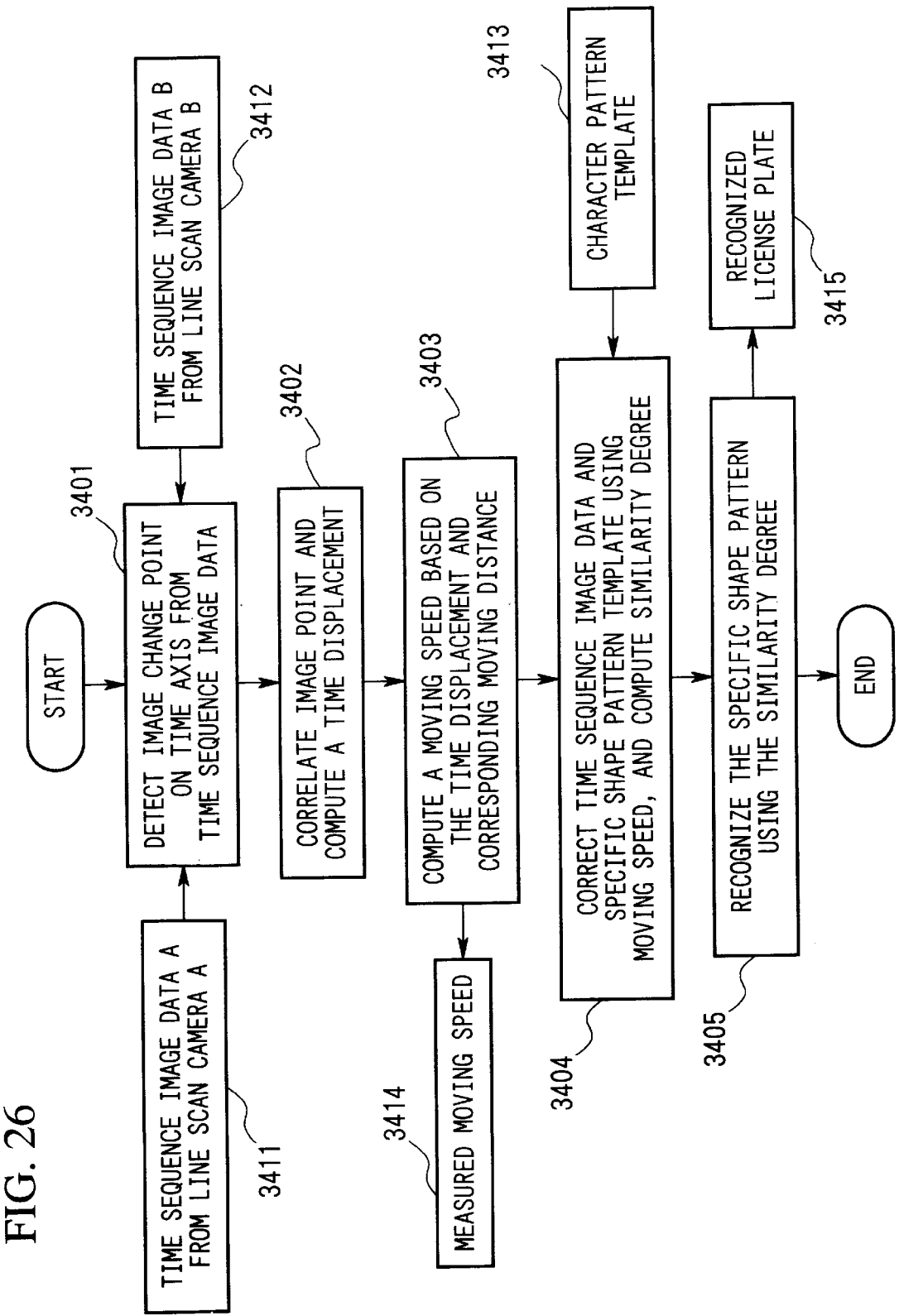
FIG. 26 is a flowchart of the process of speed measurement and license plate recognition in Embodiment 3.

FIG. 26 shows a flowchart for the process of speed infraction detection system, which the present method of speed measuring is applied to, and the process will be explained below.

First, time sequence images A produced by the line scan camera A and time sequence images produced by line scan camera B are obtained, and detect an image change point on the time axis from each time sequence image data (step 3401).

FIG. 27 shows an example of time-dependent change in the amount of change between two consecutive images, a first 1-line image and a second 1-line image immediately preceding the first 1-line image, and from the threshold value for the amount of change, it is possible to detect an image change point.

Next, image change points in time sequence images A and B are correlated to each other and moving time intervals are computed (step 3402). When the moving direction of the moving vehicle is already determined, the vehicle crosses the cameras in the order of line scan camera A and line scan camera B. Therefore, an image change point is detected from the time sequence image data A, and an image change point in the time sequence image data B, that follows immediately the images in camera A, can be identified as the starting point. Therefore, the moving distance Lr between the two line scan cameras and the moving time Tv are as shown in FIG. 28.

Next, moving velocity of the vehicle Vm is computed using the moving distance Lr and the moving time Tv (step 3403). The moving velocity is obtained from the following expression.

$Vm=Lr/Tv$

Next, the time sequence image data and the template for the pre-stored character pattern are corrected using the moving speed, and the degree of similarity is computed (step 3404). Then, based on the degree of similarity, of the license plate is recognized according to the degree of similarity, and the result of identification is output (step 3405).

FIG. 29 shows examples of the time sequence image data obtained from a fast moving vehicle and a slow moving vehicle. As shown in FIG. 29, the characters on the license plate are extended when the speed is low and are compressed when the speed is fast. Therefore, by dividing the time axis in each time sequence image data by the moving speed, the height of the characters on the license plate can be normalized. If the characters can be normalized, the license plate of the moving vehicle can be identified without being affected by the moving speed, using the conventional license plate recognition technique (refer to reference 4, Character Recognition in Scene Images, Society of Manufacturing Engineers, 1989) based on the degree of similarity. In the present example, because there are two image data from line scan camera A and line scan camera B for identification purposes, license plate can be checked against each image to improve the accuracy of identification.

When identification of the license plate becomes possible, the portion which matches exactly in both time sequence image data A and time sequence image data B, the moving time interval of the license plate is recalculated to improve the precision of moving speed determination.

Accordingly, it becomes possible to measure the speed of a vehicle exceeding the regulation speed, to the identify the characters on the license plate of the vehicle, and to accumulate the images of the driver.

It should be noted, in the explanations provided above, that reference numerals 108, 205, 303, 702, 803, 1202, 1303, 1902, 2003, 2102, 2202, 3102 refer to the same time sequence image data A. Similarly, reference numerals 109, 206, 304, 703, 804, 1203, 1304, 1903, 2004, 2103, 3303, 3103, 3204 refer to the same line scan camera B. Similarly, reference numerals 701, 801, 1201, 1301, 1901, 2001, 2101, 2201 refer to the object for measurement.

And similarly, reference numerals 306, 806, 1305, 2005, 3205 refer to the line axes separation distance L. Similarly, reference numerals 307, 807, 2007, 3207 refer to the moving distance Lx of the object. Similarly, reference numerals 506, 1103, 1403, 3604 refer to the moving time interval Tv required by the object to move the moving distance Lr. Similarly, reference numerals 1104, 1404 refer to image recording time interval Tm from the starting point to the ending point.

Further, the processes described above may be performed by recording application programs for performing the processes, and loading the programs in a computer system to execute the programs. Computer system, in this context, includes any operating systems (OS) and peripheral hardwares.

Computer-readable recording media include portable media such as floppy disks, opto-magnetic disks, ROM, CD-ROM, as well as fixed devices such as hard disks housed in computer systems. Computer-readable memory media further include short-term volatile memories (RAM) used in servers and client computer systems for transmitting applications through such networking means as the Internet or telephone circuits, as well as other short-term memories such as volatile memories used in servers and client computer systems.

And, the above programs may be transmitted from computer means storing the program in memories and the like to other computer means through transmission media or by signal waves transmitted through the media. Here, the transmission media for transmitting programs refer to those media such networking means (communication nets) as the Internet and communication circuits (communication lines) having capabilities for transmitting information.

Application programs may perform a part of the described functions. Further, these programs may be operated in conjunction with pre-recorded programs stored in computer systems to provide differential files (differential programs).

The present invention has been demonstrated with reference to the drawings in the embodiments discussed above, but the structure of the apparatus is not limited to the specific structures presented in the embodiments, and includes designs that are encompassed by the essence of the invention.

What is claimed is:

1. An apparatus for processing image data of an object body containing a specific shape pattern that is recognizable as an image and moving along a given track relative to an observation point, said apparatus comprising:

image acquiring sections for obtaining time sequence image data recorded by synchronously operating line image acquiring apparatuses arranged transversely to the given track to record time sequence images appearing between parallel line axes at a constant timing determined by a line scanning cycle;

time computing sections for computing a size of the line displacement of the object body on the time axis between image acquiring positions of the line image acquiring apparatuses, by correlating the object body between the framed images of time sequence image data, and obtaining a moving time interval according to the computed value of line displacement and the line scan timing;

speed computing sections for obtaining a relative speed of the object body according to the moving time interval and a distance separating the line image acquiring positions of the image acquiring apparatuses arranged on the given track;

scale correcting sections for matching a time scale of the time sequence image data and a time scale of a template for the specific shape pattern by correcting respective time scales by dividing the time axis in each time sequence image data by the relative moving speed obtained by the speed computing sections;

pattern detecting sections for computing a similarity degree between the time sequence image data and the template selected from predefined specific shape patterns so as to detect the specific shape pattern contained in the object body and identify the object body; and speed recalculating sections for obtaining the relative speed of the object body by recalculating the moving time interval of the portion of the specific shape pattern detected by said pattern detecting sections.

2. An apparatus for processing image data of an object body containing a specific shape pattern that is recognizable as an image and moving along a given track relative to an observation point, said apparatus comprising:

image acquiring sections for obtaining time sequence image data recorded by synchronously operating a plurality of line image acquiring apparatuses, arranged transversely to the given track of the moving object body, so as to record time sequence images appearing between two parallel line axes at a constant timing determined by a line scanning cycle;

time computing sections for correlating framed images of the object body in the time sequence image data by counting a similarity degree, and obtaining a moving time interval of the object body, to move between the line image acquiring apparatuses, from said correlated images according to the value of line displacement of the object body and the line scanning cycle;

speed computing sections for obtaining a relative speed of the object body relative to the observation point according to the moving time interval and a distance separating the line image acquiring positions of the line image acquiring apparatuses on the given track;

scale correcting sections for matching a time scale of the time sequence image data and a time scale of a template for the specific shape pattern by correcting respective time scales by dividing the time axis in each time sequence image data by the relative moving speed obtained by the speed computing sections;

pattern detecting sections for computing a similarity degree between the time sequence image data and the template selected from predefined specific shape patterns so as to detect the specific shape pattern contained in the object body and identify the object body; and speed recalculating sections for obtaining the relative speed of the object body by recalculating the moving time interval of the portion of the specific shape pattern detected by said pattern detecting sections.

* * * * *